(12) United States Patent
Tezaur

(10) Patent No.: US 12,482,190 B2
(45) Date of Patent: Nov. 25, 2025

(54) METHODS AND APPARATUS TO CONTROL APPEARANCE OF VIEWS IN FREE VIEWPOINT MEDIA

(71) Applicant: Intel Corporation, Santa Clara, CA (US)

(72) Inventor: Radka Tezaur, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/690,405

(22) Filed: Mar. 9, 2022

(65) Prior Publication Data

US 2022/0198768 A1   Jun. 23, 2022

(51) Int. Cl.

| | |
|---|---|
| *G06T 19/00* | (2011.01) |
| *G06T 3/18* | (2024.01) |
| *G06T 7/50* | (2017.01) |
| *G06T 7/70* | (2017.01) |
| *G06T 15/10* | (2011.01) |
| *G06V 10/25* | (2022.01) |

(Continued)

(52) U.S. Cl.
CPC .............. *G06T 19/006* (2013.01); *G06T 3/18* (2024.01); *G06T 7/50* (2017.01); *G06T 7/70* (2017.01); *G06T 15/10* (2013.01); *G06V 10/25* (2022.01); *H04N 5/2628* (2013.01); *H04N 23/90* (2023.01); *G06T 2200/24* (2013.01); *G06T 2207/20101* (2013.01); *G06T 2207/20132* (2013.01); *G06T 2207/30244* (2013.01)

(58) Field of Classification Search
CPC .......... G06T 19/006; G06T 3/18; G06T 7/50; G06T 7/70; G06T 15/10; G06T 2200/24; G06T 2207/20101; G06T 2207/20132; G06T 2207/30244; G06T 15/205; G06V 10/25; H04N 5/2628; H04N 23/90; H04N 17/002; H04N 23/60

See application file for complete search history.

(56) References Cited

U.S. PATENT DOCUMENTS

| | | | |
|---|---|---|---|
| 10,368,062 B2 * | 7/2019 | Briggs | G06T 15/06 |
| 10,390,005 B2 * | 8/2019 | Nisenzon | H04N 13/271 |
| 11,017,585 B1 * | 5/2021 | Toksvig | H04N 5/2224 |

(Continued)

FOREIGN PATENT DOCUMENTS

| | | | | |
|---|---|---|---|---|
| JP | 2011248630 A | * | 12/2011 | G06T 3/00 |
| KR | 102049245 B1 | * | 11/2019 | H04N 23/90 |
| WO | WO 2019/175057 A1 | * | 9/2019 | G06T 15/20 |

*Primary Examiner* — Ryan R Yang
(74) *Attorney, Agent, or Firm* — Hanley, Flight & Zimmerman, LLC

(57) ABSTRACT

Methods and apparatus to control appearance of views in free viewpoint media are disclosed. An apparatus includes at least one memory; instructions; and processor circuitry to execute the instructions to: determine a first point in three-dimensional space relative to a plurality of real-world cameras, the first point corresponding to a region of interest in a real-world scene to be captured by the real-world cameras; determine, independent of the first point, a second point in the three-dimensional space; and determine parameters for a virtual camera based on both the first point and the second point, the parameters to enable generation of a virtual image from a perspective of the virtual camera based on a modification of a real-world image captured by one of the real-world cameras.

20 Claims, 20 Drawing Sheets

(51) Int. Cl.
*H04N 5/262* (2006.01)
*H04N 23/90* (2023.01)

(56) References Cited

U.S. PATENT DOCUMENTS

| | | | |
|---|---|---|---|
| 2010/0182400 A1* | 7/2010 | Nelson | G06T 19/006 348/42 |
| 2015/0181198 A1* | 6/2015 | Baele | G06T 7/50 348/46 |
| 2019/0012804 A1* | 1/2019 | Wang | G06T 7/593 |
| 2020/0188787 A1* | 6/2020 | Downing | G06T 15/20 |
| 2020/0226819 A1* | 7/2020 | Youngquist | G06T 7/20 |

* cited by examiner

METHODS AND APPARATUS TO CONTROL APPEARANCE OF VIEWS IN FREE VIEWPOINT MEDIA

FIELD OF THE DISCLOSURE

This disclosure relates generally to free viewpoint media and, more particularly, to methods and apparatus to control appearance of views in free viewpoint media.

BACKGROUND

Free viewpoint media is visual media in which the particular perspective or viewpoint of a real-world scene depicted in the media can be freely adjusted or changed. Free viewpoint media can be based on still images captured of a real-world scene, in which case the scene is fixed as the viewpoint is changed to provide a different perspective or view of the scene (e.g., from different angles). Free viewpoint media can also be based on video captured of a real-world scene in which case the scene can change over time as the video plays while the viewpoint of the scene is also changing. In some instances, the particular viewpoints selected during a presentation of free viewpoint media can be fixed (e.g., preselected by the creator of the media) or otherwise automatically controlled (e.g., by the system presenting the media). In other instances, the particular viewpoints of a scene represented in free viewpoint media can be dynamically adjusted or controlled by a user viewing the media.

BRIEF DESCRIPTION OF THE DRAWINGS

In general, the same reference numbers will be used throughout the drawing(s) and accompanying written description to refer to the same or like parts. The figures are not necessarily to scale.

Figure 1:
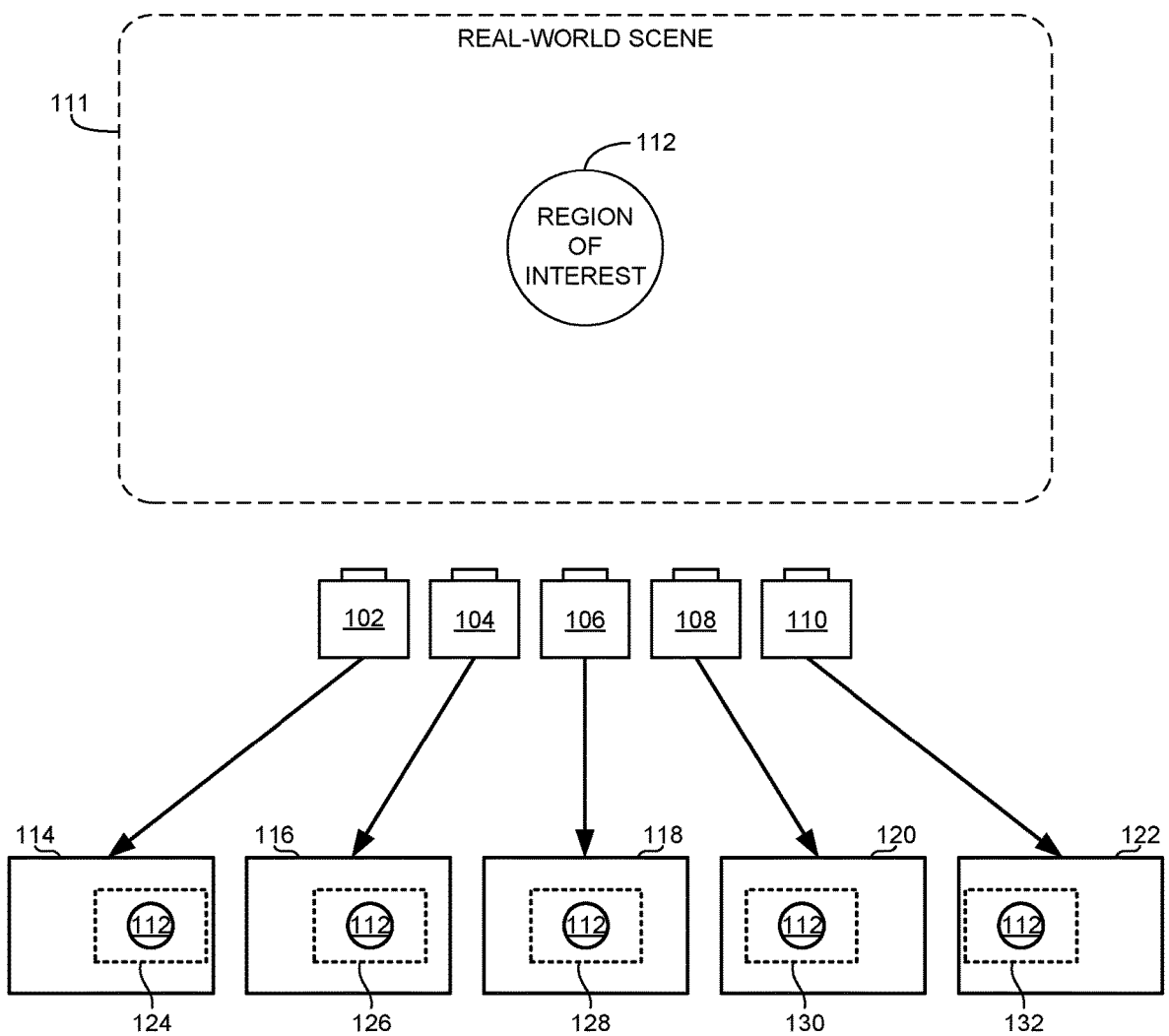
FIG. 1 illustrates a linear array of cameras that may be used to generate free viewpoint media.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Free viewpoint media (also referred to as variable viewpoint media) can be generated by capturing images or video of a real-world scene from multiple different angles simultaneously using multiple different cameras. The image data and/or video data representative of the scene captured from different angles is sometimes collectively referred to as light field data. Generating and/or presenting media based on light field data (e.g., free viewpoint media) makes it possible to create immersive viewing experiences allowing users to move around and experience the captured scene freely from different viewpoints of their choice. The design and implementation of such light field capture and free viewpoint viewing systems is very challenging. The proper implementation of such systems involves considerations associated with the properties and limitations of different cameras being used to capture the light field data, the position and nature of the scene being captured by the different cameras, the storing and processing of the captured light field data, and the presentation of playback of the media responsive to user input controlling the viewpoint of the scene represented in the media. In many instances, the light field capture may be implemented at a first location, with at least some of the image processing being performed at a second location (e.g., using cloud computing), and the end user viewing the free viewpoint at a third location. Thus, free viewpoint media also involves consideration for hardware and software used for streaming and transmitting and processing data in an efficient manner.

The particular specifications for the appearance of the views available for selection and control by a user in free viewpoint media as well as the manner of controlling the appearance and/or changes in viewpoint (whether controlled automatically by the system or selected by users capturing and/or viewing the media) can have significant impacts on both the design requirements that need to be met by various aspects of the system as well the performance of the entire system.

For instance, in the illustrated example of FIG. 1, a set of five cameras 102, 104, 106, 108, 110 arranged in a linear array are used to capture images of a real-world scene 111. FIG. 1 shows separate images 114, 116, 118, 120, 122 corresponding to each of the cameras 102, 104, 106, 108, 110. Based on the different positions of the cameras 102, 104, 106, 108, 110 relative to the scene 111, each camera 102, 104, 106, 108, 110 will capture a different viewpoint of a region of interest 112 within the scene 111. This is represented in FIG. 1 by the different position of the region of interest 112 within each of the captured images 114, 116, 118, 120, 122. However, as discussed further below, each of the images 114, 116, 118, 120, 122 can be cropped to identify suitable cropped portions 124, 126, 128, 130, 132 that are centered around the region of interest 112. As used herein, the region of interest refers to the portion of the scene that is the primary or intended subject matter to be the focus of a free viewpoint media item generated based on images captured by the cameras 102, 104, 106, 108, 110. Thus, the region of interest 112 is located within an area that is within the field of view of each of the cameras 102, 104, 106, 108, 110. The region of interest 112 may correspond to a relatively small area within the field of view of the cameras 102, 104, 106, 108, 110 (e.g., a person, an object, etc.) or may correspond to a relatively large area within (or even all of) the field of view of the cameras (e.g., a group of people, an entire room, etc.). Depending on the nature of the region of interest 112 and its relative position to the set of cameras 102, 104, 106, 108, 110, there may be aspects of the scene 111 in front of (e.g., in the foreground), behind (e.g., in the background), above, below, or to the side of the region of interest 112 that are within the field of view of the cameras 102, 104, 106, 108, 110.

As noted above, due to the different positions of the cameras 102, 104, 106, 108, 110 relative to the region of interest 112, each camera 102, 104, 106, 108, 110 will capture a slightly different view of the region of interest. Furthermore, views at locations between adjacent ones of the cameras 102, 104, 106, 108, 110 can be interpolated from the images captured by the cameras 102, 104, 106, 108, 110. As a result, it is possible to generate images from any viewpoint along the line defined by the cameras 102, 104, 106, 108, 110 between the two outermost cameras 102, 110. It may even be possible to generate images representative of viewpoints beyond the outermost cameras 102, 110.

For purposes of explanation, let it be assumed that the cameras 102, 104, 106, 108, 110 are arranged in a perfectly straight line, and that each camera 102, 104, 106, 108, 110 points in a direction exactly perpendicular to that straight line. That is, the principal axis (also referred to as the optical axis) of each camera 102, 104, 106, 108, 110 is parallel with the principal axis of every other camera 102, 104, 106, 108, 110 and the image plane for each camera 102, 104, 106, 108, 110 is coplanar with every other camera 102, 104, 106, 108, 110. As used herein, the "principal axis" of a camera corresponds to a line that extends normal (e.g., perpendicular) to an image plane of the camera and passes through a center of the aperture of the camera. Further, let it be assumed that the cameras 102, 104, 106, 108, 110 do not have any geometric distortion. In actual practice, the cameras are likely to exhibit at least some distortion and likely not to be perfectly aligned and/or pointing in exactly the same direction. However, even assuming a perfect arrangement of the cameras 102, 104, 106, 108, 110 as outlined above, using the images directly captured by the cameras to interpolate intermediate views of the region of interest 112 is likely to produce free viewpoint media that does not produce an intended appearance as the presentation of the scene (and the region of interest 112 in particular) moves between different viewpoints. In particular, due to principles of parallax, objects in the scene that are far away (e.g., in the background) appear to remain stationary while objects that are closer (e.g., in the foreground) will appear to shift across the display as the free viewpoint media is moved between different viewpoints. More particularly, the closer the object to the cameras 102, 104, 106, 108, 110, the more the object will appear to shift. This is problematic because it is common for objects relatively close to the cameras 102, 104, 106, 108, 110 (e.g., in the foreground) to correspond to the region of interest 112 (e.g., the intended point of focus for a viewer viewing the media).

Figure 2:
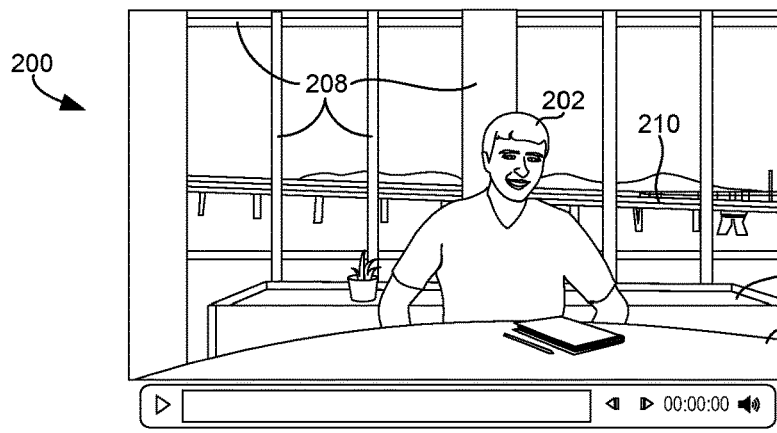
FIGS. 2-5 are screenshots of a free viewpoint video generated based on images captured by the cameras of FIG. 1.
Figure 3:
Figure 4:
Figure 5:
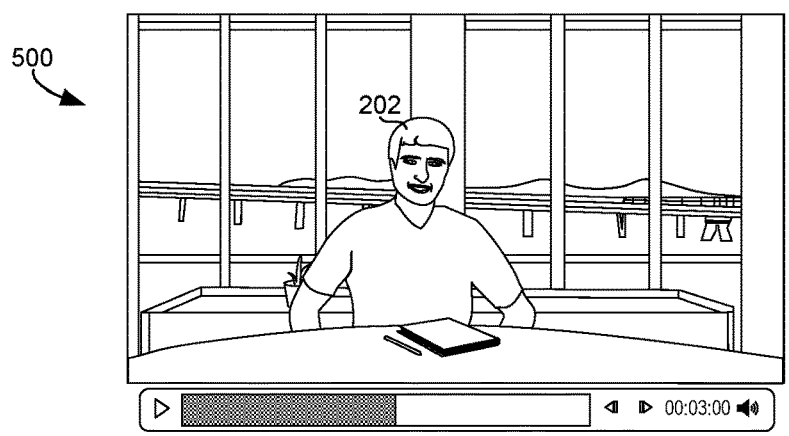
Figure 6:
FIGS. 6-9 are screenshots of a free viewpoint video generated based on images that have been asymmetrically cropped to maintain a person in the center of the video.
Figure 7:
Figure 8:
Figure 9:

The above problem is demonstrated by screenshots 200, 300, 400, 500 of a free viewpoint video represented in FIGS. 2-5. The video is a free viewpoint video that starts from the viewpoint of the leftmost camera 102 of FIG. 1 and moves the viewpoint across the array of cameras until reaching the viewpoint of the rightmost camera 110 before reversing the direction of movement and returning back to the viewpoint of the leftmost camera 102. Thus, the video represented in FIGS. 2-5 starts and ends at the viewpoint associated with the leftmost camera 102 with the midpoint of the video corresponding to the rightmost camera 110. Turning in detail to the figures, the screenshot 200 of FIG. 2 shows the first frame of the video (e.g., at 0 seconds) associated with the viewpoint of the leftmost camera 102 of FIG. 1, the screenshot 300 of FIG. 3 shows the frame of the video at 1 second, the screenshot 400 of FIG. 4 shows the frame of the video at 2 second, and the screenshot 500 of FIG. 5 shows the frame at the midpoint of the video (e.g., at 3 seconds) associated with the viewpoint of the rightmost camera 110 of FIG. 1.

As shown in the screenshots 200, 300, 400, 500 of FIGS. 2-5, a person 202 is sitting at a table 204 with a desk 206 behind the person 202. Behind the desk 206 is a window frame 208 through which a pier 210 is visible in the distant background. In this example, the person 202 corresponds to the region of interest 112 (e.g., the primary or intended focus) of the video. However, as is clear from the different screenshots 200, 300, 400, 500, the person 202 shifts across the screen as the viewpoint of the scene changes during the video while the pier 210 in the background remains substantially fixed (e.g., the gaze is locked at infinity), resulting in an awkward and/or undesirable appearance. To lock the gaze of the different views of the free viewpoint media on the main subject (e.g., the person 202 as the region of interest 112) requires the images captured by the cameras 102, 104, 106, 108, 110 (and the interpolated images) to be rectified or adjusted to keep the person 202 at a fixed location despite changes to the viewpoint.

Rectifying images so that a particular region of interest 112 remains at a fixed location across different viewpoints depends on the location of the region of interest 112 relative to the position and orientation of the cameras 102, 104, 106, 108, 110. One approach to fixing the location of the region of interest 112 is to crop the images captured by the cameras 102, 104, 106, 108, 110 before interpolation. More particularly, the images from each camera 102, 104, 106, 108, 110 are cropped in a different way so that the region of interest 112 remains at the same location across the different cropped portions of the images initially captured by the cameras 102, 104, 106, 108, 110. This is represented by the images 114, 116, 118, 120, 122 shown in FIG. 1 respectively corresponding to different ones of the cameras 102, 104, 106, 108, 110. As shown in the illustrated example, the region of interest 112 shifts position within each one of the images 114, 116, 118, 120, 122. However, FIG. 1 also shows a cropped portion 124, 126, 128, 130, 132 in each respective image 114, 116, 118, 120, 122 that shifts with the region of interest 112 so that the region of interest remains centered within the cropped portion of each image. As a result, when the cropped portions 124, 126, 128, 130, 132 are used to interpolate intermediate views to generate free viewpoint media, the region of interest will remain centered across all viewpoints. The shifting of the cropped portion across different images is sometimes referred to as asymmetric cropping.

FIGS. 6-9 are screenshots 600, 700, 800, 900 of another free viewpoint video similar to the video represented in FIGS. 2-5 with the same sweep of viewpoints from the leftmost camera 102 (at the start of the video) to the rightmost camera 110 (at the midpoint of the video) and back to the leftmost camera 102 (at the end of the video). However, FIGS. 6-9 differ from FIGS. 2-5 in that the video frames associated with screenshots 600, 700, 800, 900 of FIG. 6-9 were generated from asymmetrically cropped images that maintain the person 202 at the center of the video across all viewpoints.

Asymmetrically cropping images as outlined above to fix the location of a region of interest 112 is a convenient approach when all the cameras 102, 104, 106, 108, 110 are arranged in a straight line as described above because it is computationally efficient. More particularly, cropping is a simple operation and calculating the optical flow can be limited to one dimension (e.g., the horizontal direction) without the need for the more general and complicated two dimensional optical flow calculations. As used herein, optical flow refers to the apparent shift of pixels in two images that correspond to the same real-world points captured in the images due to a change in perspective between the images (e.g., based on the different position of two cameras capturing the images). Optical flow is used for depth estimation of objects in the real-world scene captured in the images and is also used to interpolate intermediate images associated with viewpoints between the original images.

While cropping images as outlined above has the advantage of computational efficiency and produces free viewpoint media with a region of interest 112 at a fixed location, there are limitations with this technique. For instance, as shown in FIG. 1, the cropped portions 124, 126, 128, 130, 132 of the images 114, 116, 118, 120, 122 are relatively small which can limit the size and/or resolution of the final free viewpoint media content to significantly less than the field of view and associated resolution of the cameras 102, 104, 106, 108, 110. Furthermore, as the baseline distance between the cameras increases (e.g., the distance between the outermost cameras 102, 110 increases), the region of interest 112 may shift too far to the side of a resulting image such that there is insufficient image data to properly crop the desired area surrounding the region of interest 112. That is, as shown in FIG. 1, the cropped portions 124, 132 of the images 114, 122 associated with the outermost cameras 102, 110 nearly reach the outer edge of the images 122. As a result, if the cameras were spaced farther apart, the desired cropped portion may extend beyond the edge of an associated image. Furthermore, even if the cropped portion remains within the perimeter of an associated image, if the cropped portion is close to the edge of the image, there may be strong perspective distortion within the cropped portion that can reduce the quality of resulting images used for the free viewpoint media. Perspective distortion (in which objects appear to be stretched or leaning) near the edges of images can be particularly problematic for wide angle lenses.

Figure 10:
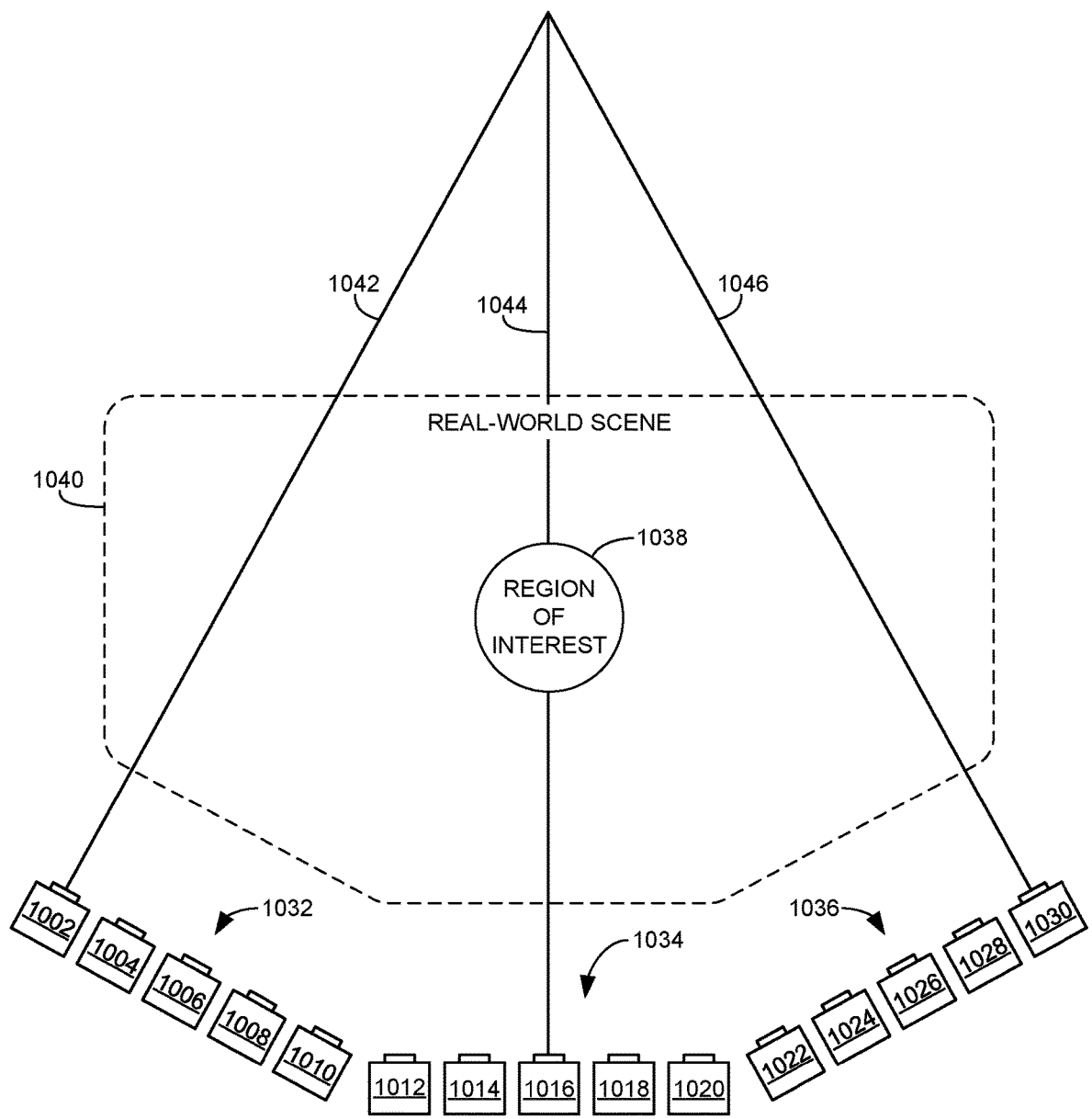
FIG. 10 illustrates a non-linear array of cameras that may be used to generate free viewpoint media.

Another problem with using cropped images to generate free viewpoint media arises when the cameras used to capture the images are spatially arranged in a manner that is more complex than the simple example outlined above in which all cameras are in a straight line and point in the same direction. In particular, when not all cameras are facing in the same direction, fixing the gaze across different views in free viewpoint media on a particular region of interest 112 by cropping the images, as outlined above, can result in sudden jumps in the angles of views represented in a free viewpoint image. For instance, consider the set of fifteen cameras 1002-1030 shown in FIG. 10 that are arranged in a non-linear array made up of three separate linear arrays 1032, 1034, 1036 of five cameras each. As shown in the illustrated example, the central array 1032 of cameras is centered on a region of interest 1038 within a real-world scene 1110 with the other two arrays 1032, 1036 angled forward on either side of the central array 1034. For purposes of explanation, the principal axes 1042, 1044, 1046 of the leftmost camera 1002, the center camera 1016, and the rightmost camera 1030 are shown in FIG. 10. In the illustrated example, each of the five cameras 1002-1010 in the first linear array 1032 have a principal axis pointing in the same direction as (e.g., parallel to) the principal axis 1042 of the leftmost camera 1002. Similarly, each of the five cameras 1012-1020 in the second linear array 1034 have a principal axis pointing in the same direction as (e.g., parallel to) the principal axis 1044 of the center camera 1016. Likewise, each of the five cameras 1022-1030 in the third linear array 1036 have a principal axis pointing in the same direction as (e.g., parallel to) the principal axis 1046 of the rightmost camera 1030. Thus, while the cameras in any one of the linear arrays 1032, 1034, 1036 are all pointing in the same direction, the cameras in different arrays 1032, 1034, 1036 are angled relative to one another. As such, generating free viewpoint media content by cropping images captured by cameras in any one of the arrays 1032, 1034, 1036 would produce media that would appear similar to the video represented in FIGS. 6-9 in which the gaze of the different viewpoints remain fixed on the region of interest 1028 and provide a smooth transition across all associated viewpoints. However, combining cropped images from cameras in different ones of the arrays 1032, 1034, 1036 to generate free viewpoint media with viewpoints that extend across all fifteen cameras 1002-1030 would result in sudden jumps (e.g., non-smooth transitions) when moving between views associated with different ones of the linear arrays. This is demonstrated by the screenshots 1100, 1200, 1300, 1400, 1500, 1600 of FIGS. 11-16.

Figure 11:
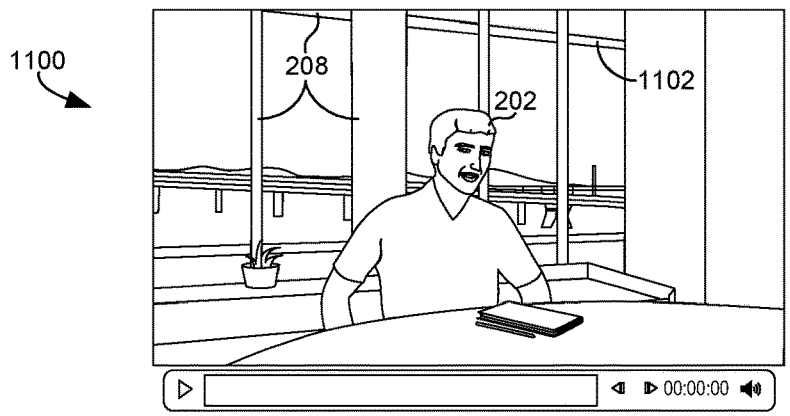
FIGS. 11-16 are screenshots of a free viewpoint video generated based on images captured by the cameras in the non-linear array of FIG. 10.
Figure 12:
Figure 13:
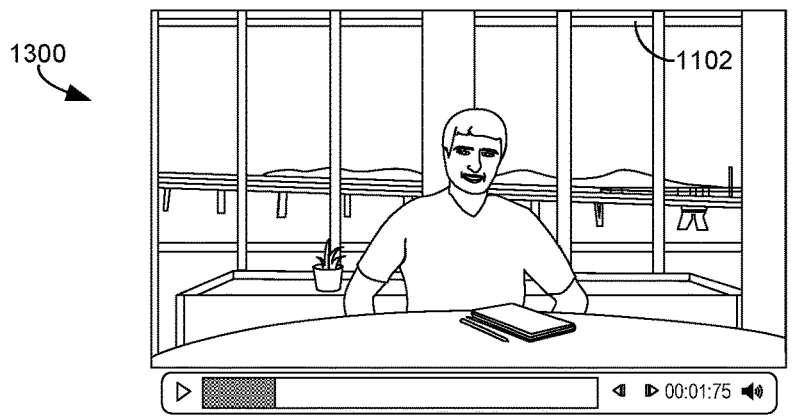
Figure 14:
Figure 15:
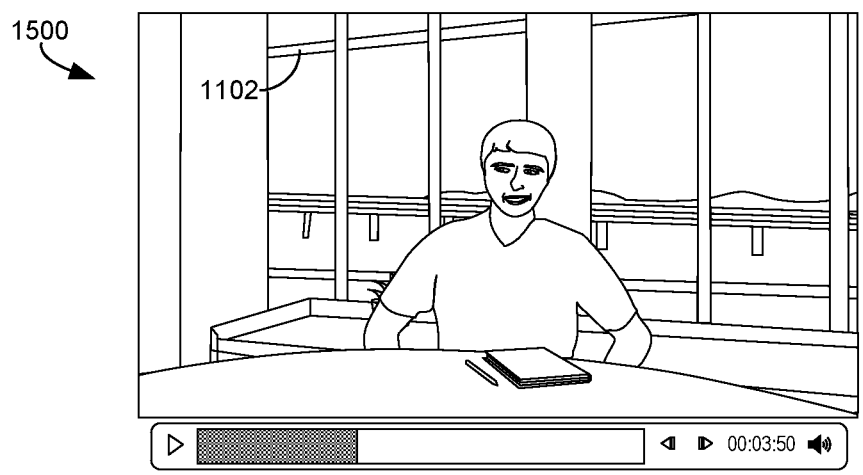
Figure 16:

The video represented by the screenshots 1100-1600 of FIGS. 11-16 is similar to the videos represented in FIGS. 2-5 and FIGS. 6-9 in that the video begins at the first (leftmost) camera 1002 of FIG. 10 and transitions across viewpoints associated with all of the cameras 1002-1030 (and interpolated viewpoints) until reaching the viewpoint associated with the rightmost camera 1030 at a midpoint of the video before reversing the path of the viewpoints back to the leftmost camera 1002. In the illustrated example, each of the screenshots 1100-1600 corresponds to the viewpoint associated with respective ones of the cameras 1002, 1010, 1012, 1020, 1022, 1030 at either end of each linear array 1032, 1034, 1036 of the cameras. Thus, the screenshot 1100 of FIG. 11 shows the first frame of the video (at 0 seconds) associated with the viewpoint of the first (leftmost) camera 1002, the screenshot 1200 of FIG. 12 shows the frame of the video (at 1.5 seconds) associated with the fifth camera 1010, the screenshot 1300 of FIG. 13 shows the frame of the video (at 1.75 seconds) associated with the sixth camera 1012, the screenshot 1400 of FIG. 14 shows the frame of the video (at 3.25 seconds) associated with the tenth camera 1020, the screenshot 1500 of FIG. 15 shows the frame of the video (at 3.5 seconds) associated with the eleventh camera 1022, and the screenshot 1600 of FIG. 16 shows the frame of the video (at the midpoint of the video corresponding to 5 seconds) associated with the fifteenth (rightmost) camera 1030. In other words, the first and second screenshots 1100, 1200 correspond to the viewpoints associated with the cameras 1002, 1010 at opposite ends of the first linear array 1032, the third and fourth screenshots 1300, 1400 correspond to the viewpoints associated with the cameras 1012, 1020 at opposite ends of the second linear array 1034, and the fifth and sixth screenshots 1500, 1600 correspond to the viewpoints associated with the cameras 1022, 1030 at opposite ends of the third linear array 1036.

The transitions between the viewpoints represented between the first video frame shown in FIG. 11 and the video frame shown in the FIG. 12 are smooth. However, there is a sudden jump or non-smooth transition to the viewpoint represented in the video frame shown in FIG. 13. This is most clearly recognizable in the figures by reference to the horizontal bar 1102 of the window frame 208 behind the person 202 in the video. In particular, as shown in the figures, the horizontal bar 1102 remains at approximately the same angle for the first 1.5 seconds of the video that extends between FIG. 11 and FIG. 12. However, as shown in FIG. 13 (a mere 0.25 seconds after FIG. 12), the angle of the horizontal bar 1102 has changed significantly. This sudden change is due to the change in direction in which the first array 1032 of cameras 1002-1010 are facing relative to the direction in which the second array 1034 of cameras 1012-1020 are facing. The next 1.5 seconds of the video are associated with the second array 1034 of cameras 1012-1020 such that the angle of the horizontal bar 1102 remains consistent, which is indicative of smooth transitions between viewpoints during this portion of the video. Then, between 3.25 seconds (FIG. 14) and 3.5 seconds (FIG. 15), a mere 0.25 seconds, there is another sudden (non-smooth) transition to the viewpoints associated with the third array 1036 of cameras 1022-1030, as indicated by the significant change in the angle of the horizontal bar 1102 in FIGS. 15 and 16 relative to that shown in FIGS. 13 and 14.

Figure 17:
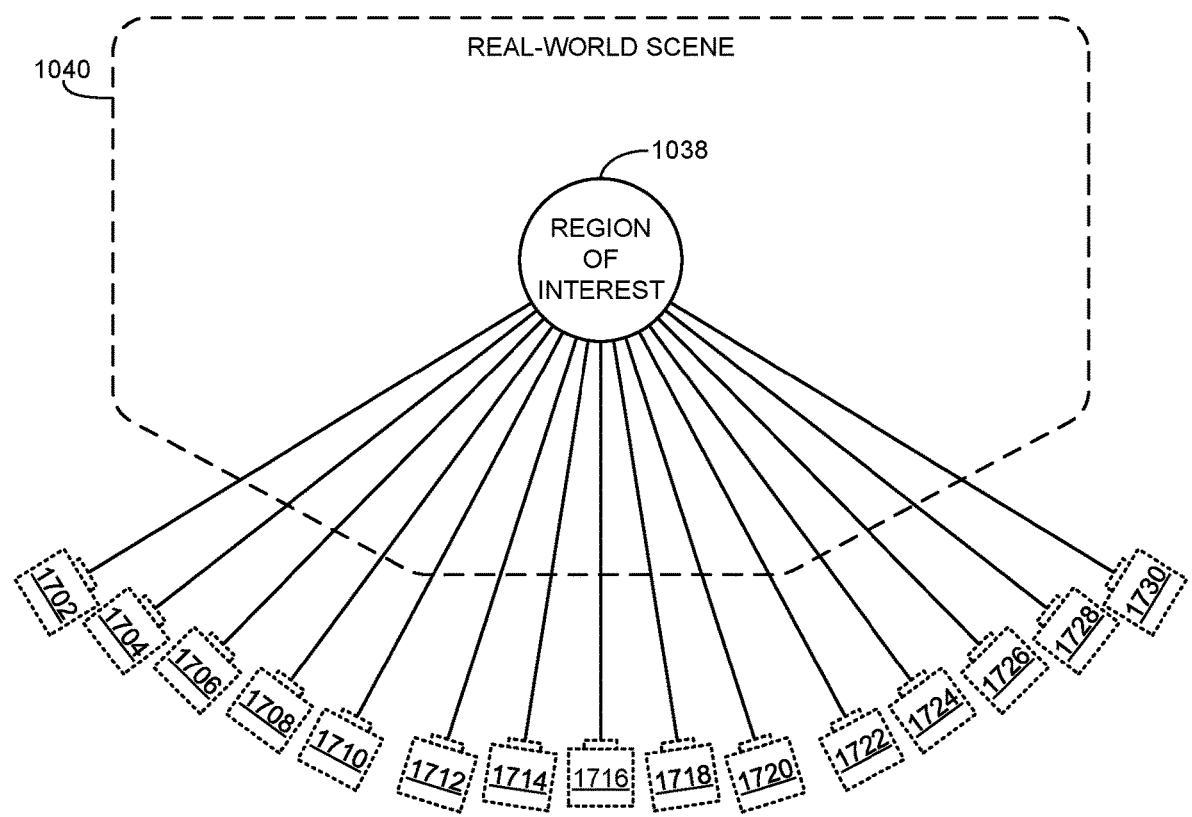
FIG. 17 illustrates a non-linear array of virtual cameras simulated to point toward a region of interest.

The abrupt changes in view direction due to the different angles of the cameras noted above can be distracting and/or disruptive to a viewer viewing free viewpoint media generated based on cameras that are not all in linear alignment. Such abrupt jumps in free viewpoint media can be eliminated by simulating a virtual camera that slowly rotates as it changes position relative to the region of interest such that the virtual camera is always facing directly towards the region of interest. This is represented in FIG. 17, which shows fifteen virtual cameras 1702-1730 that correspond to the real-world cameras 1002-1030 of FIG. 10. The virtual cameras 1702-1730 of FIG. 17 are shown in dotted lines to represent that they are virtual rather than real-world cameras. Although the virtual cameras 1702-1730 are shown and described as separate cameras, they could alternatively be described as separate locations for a single virtual camera that slowly rotates as it moves relative to the region of interest 1038. As shown in the illustrated example, the virtual cameras 1702-1730 are in the same position relative to one another and relative to the region of interest 1038 within the real-world scene 1110 as the real-world cameras 1002-1030 are in FIG. 10. However, unlike the real-world cameras 1002-1030 in FIG. 10, no two of the virtual cameras 1702-1730 have a principal axis pointing in the same direction (e.g., no two principal axes are parallel). Rather, as shown in FIG. 17, the principal axes of the virtual cameras 1702-1730 all point towards the region of interest 1038. As a result, there is a relatively small and/or incremental rotation between adjacent ones of the virtual cameras 1702-1730 that enables smooth transitions between different viewpoints across all fifteen virtual cameras.

The simulated views of the virtual cameras 1702-1730, in which the cameras are simulated to be directly facing the region of interest 1038, can be generated by modifying (e.g., warping) the images captured by the real-world cameras 1002-1030 of FIG. 10. In some examples, the nature of such warping can be achieved by modeling the virtual cameras based on perspective cameras. As used herein, a perspective camera refers to an ideal pinhole camera (e.g., not subject to geometric distortions or blurring of unfocussed objects) that can be modeled by perspective transformations or projections. The transformation or warping of a real-world image to a virtual image for a perspective (e.g., pinhole) camera is diagrammatically represented in FIG. 18.

Figure 18:
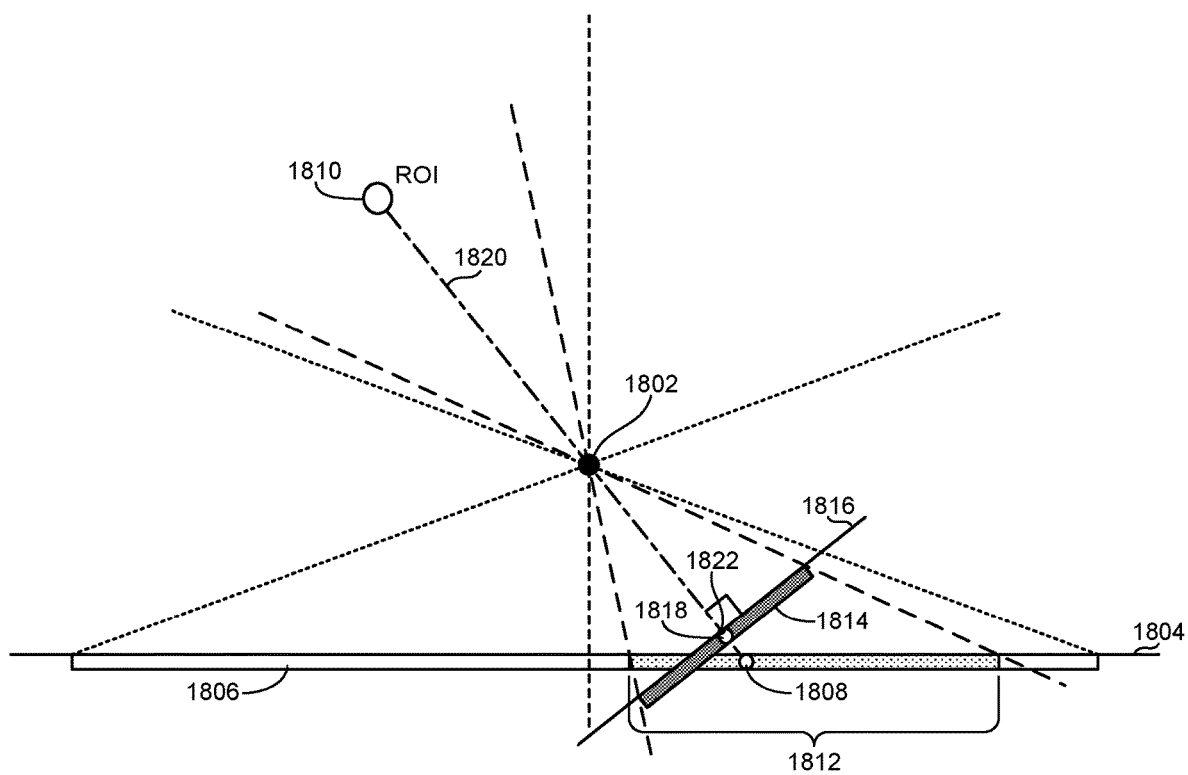
FIG. 18 illustrates the relationship between a real-world image and a virtual image associated with a virtual camera rotated in accordance with FIG. 17.

In particular, the central point 1802 in FIG. 18 represents the aperture of a real-world camera (modeled as a pinhole point). Light is projected through the aperture 1802 onto an image sensor at an image plane 1804 of the camera to produce a resulting real-world image 1806. As shown in the illustrated example, the real-world image 1806 includes a point 1808 corresponding to a region of interest (ROI) point 1810 within the three-dimensional space captured within the field of view of the camera that corresponds to the location of the region of interest on which the gaze of different views in free viewpoint media is to be fixed. In this example, a cropped portion 1812 of the real-world image 1806 is identified for use in generating a virtual image 1814 (on a corresponding virtual image plane 1816) to be used as the basis for free viewpoint media. Inasmuch as the cropped portion 1812 includes the point 1808 corresponding to the ROI point 1810, the virtual image 1814 also includes a point 1818 corresponding to the region of interest. As shown in FIG. 18, the virtual image 1814 (and the corresponding virtual image plane 1816) is rotated relative to the real-world image plane 1804 so as to be facing directly towards the ROI point 1810. That is, the orientation of the virtual image 1814 and the virtual image plane 1816 are defined based on a transformation of the portion 1812 of the real-world image 1806 so that the principal axis 1820 of the virtual camera (associated with the virtual image 1814) points directly towards the ROI point 1810. As a result of this, both the principal point 1822 of the virtual camera (e.g., the point at which the principal axis 1820 intersects the virtual image plane 1816) and the point 1818 representative of the region of interest in the virtual image 1814 are located at the center of the virtual image 1814. As discussed above, generating the virtual image 1814 so that the region of interest appears at the center of the virtual image 1814 ensures that the gaze of resulting free viewpoint media will be fixed on and appear to rotate about the ROI point 1810.

While the warping or transformation of real-world images to produce rotated virtual images as described above in connection with FIGS. 17 and 18 can enable the generation of free viewpoint media with smooth transitions between different views that maintain the gaze fixed on the region of interest, such techniques present a number of challenges. For instance, instead of a simple cropping (as when all cameras are facing the same direction as in FIG. 1), a projective transform warping is needed, which increases computational complexity. Furthermore, the warped images are no longer necessarily rectangular (like the cropped portions 124-132 of the images 114-122 shown in FIG. 1) but may be trapezoidal in shape. As a result, two-dimensional optical flow calculations are needed to generate intermediate images based on interpolation, thereby again increasing computational complexity. Additionally, when the orientation of the virtual camera involves significant rotation relative to a corresponding real-world camera, the amount of warping involved can result in significant stretching or skewing of the content of the image that can negatively impact image quality. Moreover, the significant amounts of warping needed in such situations can also significantly increase requirements on the field of view of the real-world cameras and/or the size of the camera sensor regions needed to capture images sufficient in size and/or resolution to generate acceptable free viewpoint media.

Examples disclosed herein overcome the above challenges by enabling the generation of free viewpoint media in a computationally efficient manner and that provides a smooth viewing experience across all viewpoints even when different cameras are facing in different directions. In particular, examples disclosed herein provide a smooth viewing experience that avoids abrupt jumps in viewpoint transitions by modifying (e.g., warping) the images captured by different cameras to simulate virtual cameras that are at the same location of the real-world cameras but have been rotated a certain amount. However, unlike the virtual cameras 1702-1730 shown in FIG. 30, the amount of rotation between virtual cameras and their corresponding real-world cameras is reduced, thereby reducing the extent of warping to decrease the resulting skewing and/or stretching of the images for improved image quality and to avoid the need for costly cameras that have larger fields of view and/or larger sensors that would otherwise be needed using existing techniques. Furthermore, example disclosed herein are less computationally intensive than other known approaches.

The above advantages are achieved in examples disclosed herein by modeling or simulating the views as virtual perspective cameras. The resulting appearance of an image for a virtual perspective camera based on an image captured by a corresponding real-world camera depends on the parameters defined by the virtual perspective camera. More particularly, in examples disclosed herein, free viewpoint media that provides smooth transitions across different views captured by different cameras while fixing the gaze on a particular region of interest is achieved by modifying both the virtual camera rotation parameters and the intrinsic parameters representing the position of the principal point expressed in the image pixel coordinates. As used herein, and noted above in connection with FIG. 18, the principal point of a camera refers to the point on an image plane of the camera through which the principal axis extends, which, as defined above, refers to a line that is normal to the image plane and passes through a center of the camera aperture (e.g., passes through the pinhole of a perspective camera).

Typically, the principal point of a camera corresponds to the center of a resulting image (as in FIG. 18) because the image plane is assumed to be centered and aligned with the camera aperture. However, in some examples disclosed herein, the position of the principal point is defined at a location other than the center of an image.

Figure 19:
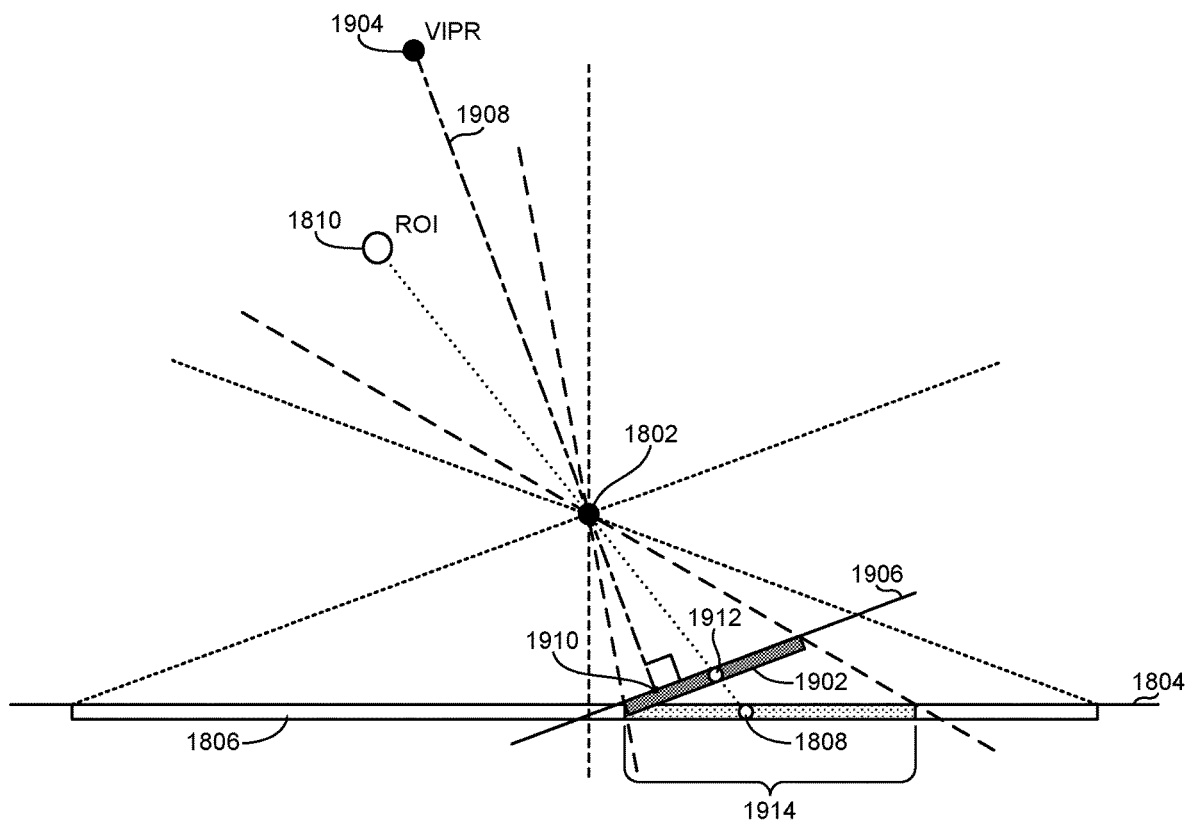
FIG. 19 illustrates the relationship between a real-world image and a virtual image rotated in accordance with teachings disclosed herein.

In some examples, the parameters defining the rotation and principal point position for a particular virtual camera are based on the location of two separate control points defined in the three-dimensional space of the real-world scene towards which a corresponding real-world camera is facing. These two control points, which can be defined independent of one another, are represented in FIG. 19. More particularly, FIG. 19 illustrates the same real-world camera represented in FIG. 18 with the region of interest (identified by the ROI point 1810) at the same location projected onto the same real-world image 1806.

Figure 20:
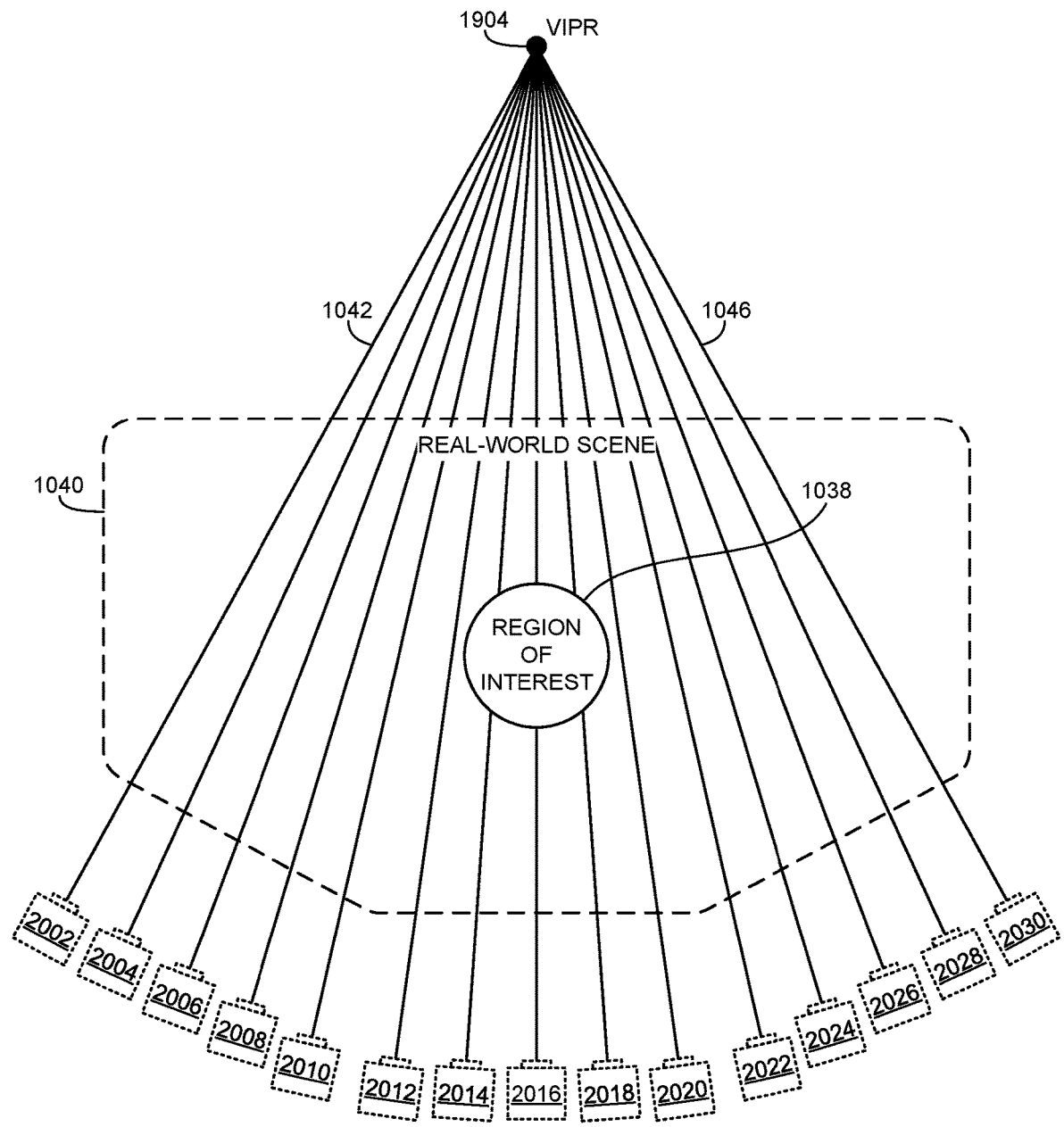
FIG. 20 illustrates a non-linear array of virtual cameras simulated in accordance with teachings disclosed herein.

In the illustrated example of FIG. 19, the first of the two control points that define the parameters for a virtual camera that produces a virtual image 1902 is a virtual image plane rotation (VIPR) point 1904. The VIPR point 1904, as its name suggests, defines the orientation or rotation (e.g., pitch and yaw) of a virtual image plane 1906 onto which the virtual image 1902 is projected. More particularly, the virtual image plane 1906 for the virtual camera is defined with an orientation that faces directly towards the VIPR point 1904. In other words, the orientation of the virtual image plane 1906 is defined such that the principal axes 1908 of the virtual camera (which, by definition, is perpendicular to the virtual image plane 1906) passes through the VIPR point 1904. In some examples, the VIPR point 1904 is fixed for all virtual cameras being used as the basis for generating free viewpoint media. As a result, instead of the principal axes of all virtual cameras pointing towards the region of interest (as represented in FIG. 18), the principal axes of all virtual cameras will converge at the VIPR point 1904 (as represented in FIG. 20).

The second control point used to determine the parameters of the virtual camera is the ROI point 1810. While the orientation (e.g., rotation angle) of the image plane 1906 relative to the real-world image plane 1804 is defined by the VIPR point, the ROI point 1810 defines the location or position of the principal point 1910 of the virtual camera relative to the virtual image 1902 used to generate free viewpoint media. As defined above and shown in FIG. 19, the principal point 1910 corresponds to the point (e.g., pixel location) on the image 1902 at which the principal axis 1908 intersects the virtual image plane 1906. Notably, unlike in the principal point 1822 in FIG. 18, the principal point 1910 of FIG. 19 is spaced apart from the center of the image 1902. The particular location of the principal point 1910 is based on the location of the ROI point 1810 because the image area is defined so as to position a point 1912 corresponding to the region of interest at the center of the image 1902. Positioning the region of interest at the center of the image 1902 ensures that the gaze of different views in resulting free viewpoint media is fixed on the region of interest (e.g., the different views will focus on and appear to pivot around the region of interest). The principal point 1910 is not positioned at the center of the image 1902 (while the region of interest is) because the VIPR point 1904 and the ROI point 1810 are at different locations. While the point 1912 representative of the region of interest is described as being fixed at the center of the image 1902, in other examples, the point 1912 can be fixed at any other location of the image. So long as the point 1912 remains at the same location across different views associated with different virtual cameras, the region of interest will remain as the fixed point of gaze about which different views of free viewpoint media will appear to rotate.

As shown by a comparison of FIGS. 18 and 19, independently defining the VIPR point 1904 at a different location than the ROI point 1810 results in the virtual image plane 1906 of FIG. 19 being rotated by a smaller angle relative to the real-world image plane 1804 than the virtual image plane 1816 of FIG. 18 is rotated relative to the real-world image plane 1804. This reduction in rotation of the virtual camera relative to the real-world camera reduces the amount of warping needed to generate the virtual image 1902, thereby improving image quality by decreasing the amount of stretching or skewing that may occur during the transformation and/or reducing the amount of geometric distortions included in the cropped portion 1914 of the real-world image because the cropped portion 1914 can remain farther away from the outer edge of the image 1806 where distortions are typically most pronounced. Furthermore, the reduced angle of rotation of the virtual image plane 1906 in FIG. 19, and the corresponding reduction in the amount of warping of the resulting virtual image 1902, also results in a reduced size of the cropped portion 1914 of the real-world image 1806 as compared with the cropped portion 1812 of FIG. 18. This reduction in the size of the cropped portion 1914 reduces the stringent requirements on the resolution, sensor size, and/or field of view of the real-world camera used to capture the real-world image 1806, which can enable the use of less expensive components or the generation of higher quality images using similarly priced components. Further, the reduced size of the cropped portion 1914 contributes to computational efficiencies because there is less image data that needs to be processed. In connection with this, it should be noted that the examples disclosed herein do not involve any special algorithms to capture or process the resulting virtual images. Therefore, the process is intuitive and enables the use of standard computer vision methods and libraries to generate free viewpoint media.

As noted above, the ROI point 1810 and VIPR point 1904 can be independently defined and may be set to any suitable location within three dimensional space. In some examples, the location of these points 1810, 1904 may be configurable by an end user. In other examples, the location of one or both of the points may be automatically determined without direct user input. The ROI point 1810 is a function of the location of the region of interest on which the gaze of the free viewpoint media is to be fixed. Accordingly, the ROI point 1810 is based on the distance and/or position of the region of interest relative to the position and orientation of the real-world cameras capturing images of the region of interest. As such, in some examples, this may easily be input by a user. However, in other examples, the position of the region of interest could be automatically determined based on machine learning models analyzing images captured by the real-world cameras.

Unlike the ROI point 1810, the VIPR point 1904 is not tied to any particular real-world location in the scene to be captured by the cameras but can be arbitrarily defined at any suitable location depending on the intended look or appearance of the free viewpoint media. A special use case of the teachings disclosed herein involves positioning the VIPR point 1904 at the same location as the ROI point 1810. This special use case results in virtual cameras directly facing towards the region of interest as represented in FIG. 17. Another special use case involves positioning the VIPR point 1904 at infinity. This special use case results in the virtual cameras all facing in the same direction similar to the arrangement shown and described in connection with FIG.

1. In other examples, the VIPR point 1904 can be defined at any other suitable point (e.g., a short distance beyond the ROI point 1810 as represented in FIG. 19). In the illustrated example of FIG. 20, the VIPR point 1904 is shown as being aligned with and/or centered with the central camera 2016, which is also aligned with the region of interest 1038 (associated with the ROI point 1810). However, in other examples, the ROI point 1810 and/or the VIPR point 1904 may be offset relative to the central camera 2016 and/or offset relative to one another.

Although the location of the VIPR point 1904 can be arbitrarily defined, certain locations for the VIPR point 1904 enhance (e.g., optimize) image quality and/or reduce requirements to the fields of view of the cameras and the associated resolution and/or size of the image sensor. More particularly, in some examples, these advantages can be achieved by selecting a location for the VIPR point 1904 that reduces (e.g., minimizes) the rotation angles of the virtual cameras relative to the corresponding real-world cameras. Reducing the angle of rotation of virtual cameras relative to corresponding real-world cameras reduces the amount of image warping needed to generate the resulting virtual images, thereby enhancing image quality, and reducing camera requirements as noted above. The particular location for the VIPR point 1904 that reduces the rotation angles of the virtual cameras is dependent on the position and orientation of the real-world cameras used to capture the images of the real-world scene containing the region of interest.

In some examples, the VIPR point 1904 is selected to be on the principal axes of one or more of the real-world cameras that are farthest away from a central point across the full distribution of all cameras being used to generate free viewpoint media. For instance, as shown in the illustrated example of FIG. 20, the VIPR point 1904 is positioned at the intersection of the principal axes 1042, 1046 of the leftmost and rightmost real-world cameras 1002, 1030 of FIG. 10 with the central point across the full distribution of cameras being at the location of the center camera 1016 of FIG. 10. In other examples, the central point may be offset relative to all cameras in the full distribution. Inasmuch as the VIPR point 1904 is defined on the principal axes 1042, 1046 in this example, the leftmost and rightmost virtual cameras 2002, 2030 in FIG. 20 are not rotated relative to the corresponding real-world cameras 1002, 1030, but are pointing in the same direction as the corresponding real-world cameras 1002, 1030. Likewise, in the illustrated example of FIG. 20, the center virtual camera 2016 is not rotated relative to the center real-world camera 1016 of FIG. 10. As a result, there is no need to warp the real world images captured by the real-world cameras 1002, 1016, 1030, thereby avoiding potential distortions or stretching that may result from warping the images for a virtual image associated with a principal axis pointing directly towards the region of interest 1038 (as is the case for the leftmost and rightmost virtual cameras 1702, 1730 shown in FIG. 17). Furthermore, while all of the other virtual cameras 2004-2014, 2018-2028 are all rotated relative to the corresponding real-world cameras 1004-1014, 1018-1028, for many such cameras, the amount of rotation is less than for the corresponding virtual cameras 1704-1714, 1718-1728 of FIG. 17 that are rotated to point directly towards the region of interest.

Inasmuch as the virtual cameras 2002-2030 are not directly pointing toward the region of interest 1038, the region of interest 1038 will not always be at the same location in each virtual image. However, as described above in connection with FIG. 1, asymmetric cropping can be employed to isolate particular portions of the real-world images in a manner that keeps the region of interest 1038 at a fixed location across the cropped portions of different images. As a result, the resulting virtual images that serve as the basis for the different views in free viewpoint media will provide a gaze that is fixed on the region of interest 1038.

Figure 21:
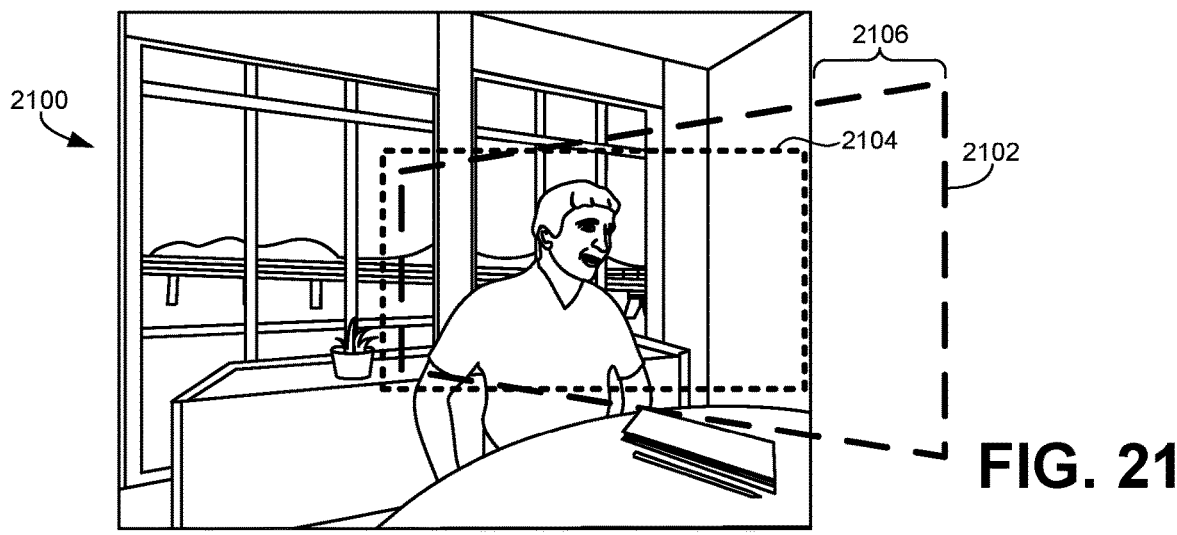
FIG. 21 represents a full image captured by a real-world camera.

In addition to reducing warping so as to improve image quality, independently defining the VIPR point 1904 from the ROI point 1810 also reduces the requirements on the fields of view of the real-world cameras used to capture images of the scene containing the region of interest. These advantages are demonstrated with reference to FIGS. 21-23. In particular, FIG. 21 represents a full real-world image 2100 captured by the leftmost real-world camera 1002 of FIG. 10 facing towards the person 202 represented in the videos of FIGS. 2-5, 6-9, and 11-16. Due to the position and orientation of the leftmost camera 1002 relative to the person 202, the person is not centered within the image 2100. Accordingly, as described above asymmetric cropping may be implemented to position the person 202 at a desired location (e.g., the center) of a cropped image. More particularly, a first cropped portion 2102 is represented in FIG. 21 for a virtual image generated using a single control point to define the parameters for the corresponding virtual camera. The single control point corresponds to the ROI point 1810 at the location of the region of interest. Using the ROI point 1810 as the single control point to define the parameters for a virtual camera results in the virtual camera being rotated relative to a corresponding real-world camera to point directly towards the region of interest, as represented in FIG. 17. By contrast, a second cropped portion 2104 is represented in FIG. 21 for a virtual image generated using two separate control points to define the parameters for the virtual camera. As discussed above, the two control points correspond to the ROI point 1810 and the VIPR point 1904. Using these two separate control points to define the parameters for a virtual camera results in the virtual camera being rotated relative to a corresponding real-world camera to point directly towards the VIPR point 1904, as represented in FIGS. 19 and 20. While the virtual camera does not necessarily point directly towards the region of interest, asymmetric cropping of the real-world image is implemented so as to position the ROI point 1810 at the center of the cropped image (or any other specified location).

Figure 22:
FIG. 22 represents an output image based on a cropping and warping of the full image of FIG. 21 based on a single control point.
Figure 23:
FIG. 23 represents an output image based on a cropping and warping of the full image of FIG. 21 based on two control points defined in accordance with teachings disclosed herein.
Figure 24:
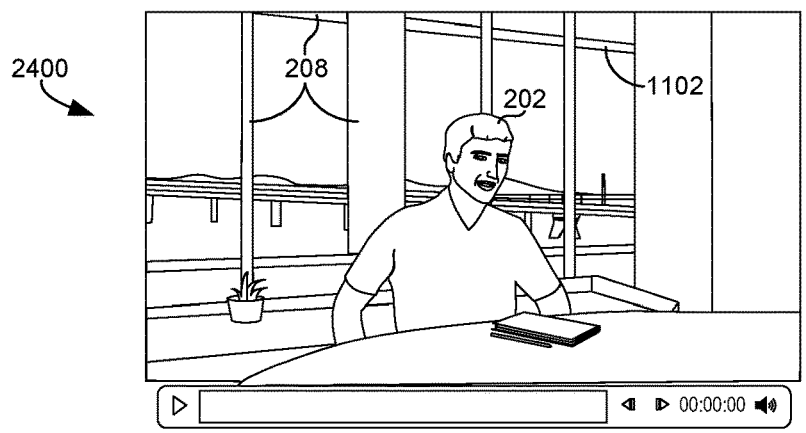
FIGS. 24-29 are screenshots of a free viewpoint video generated in accordance with teachings disclosed herein.
Figure 25:
Figure 26:
Figure 27:
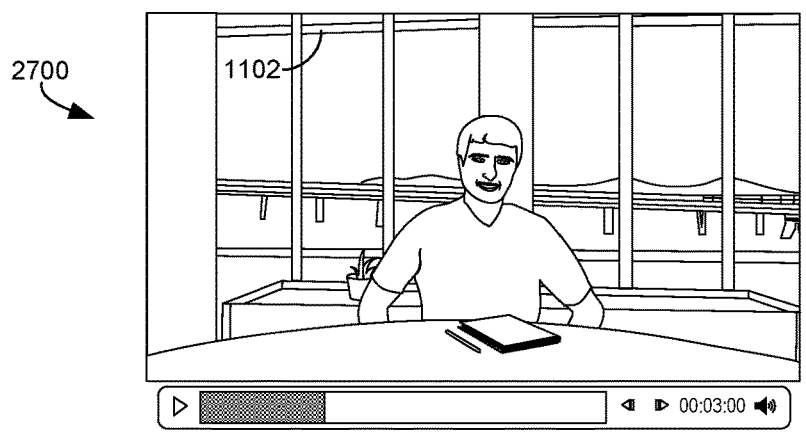
Figure 28:
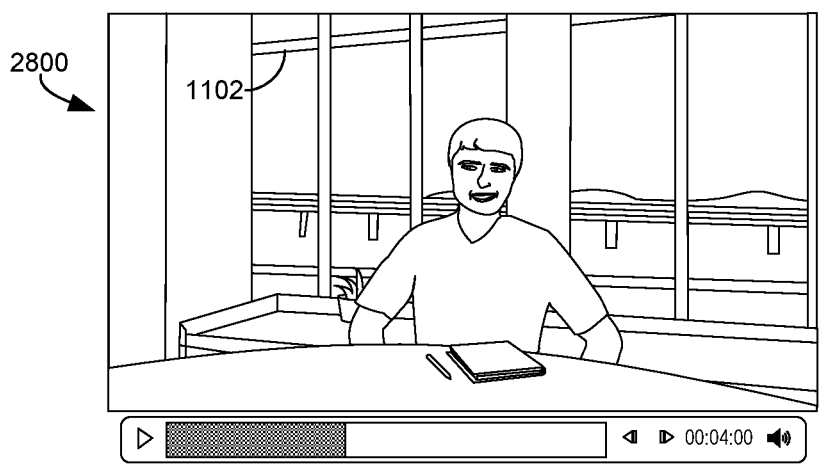
Figure 29:

As shown in FIG. 21, the first cropped portion 2102 is much larger than the second cropped portion 2104. More particularly, due to the position and orientation of the real-world camera used to capture the image 2100, to enable the person 202 to be centered in a resulting virtual image requires the first cropped portion 2102 to extend beyond the edge of the full image 2100 such that a region 2106 of the first cropped portion 2102 contains no image data. As such, the resulting virtual image will be incomplete. In particular, FIG. 22 illustrates a virtual image 2200 generated from the first cropped portion 2102 of FIG. 21 (based on a single control point). As shown in FIG. 22, the virtual image 2200 includes a region 2202 containing no image data that corresponds to the region 2106 of the cropped portion 2102 shown in FIG. 21. By contrast, FIG. 23 illustrates a virtual image 2300 generated from the second cropped portion 2104 of FIG. 21 (based on two control points). There is no missing image data in the virtual image 2300 of FIG. 23 because the second cropped portion 2014 is entirely within the boundaries of the real-world image 2100, as shown in FIG. 21. To enable the generation of virtual images that are not missing any image data using a single control point would require a camera with a larger field of view (and/or corresponding larger image sensor) to capture the surrounding area of scene to the extent of the first cropped portion 2102. Thus, defining virtual camera parameters using the two separate control points as disclosed herein enables the generation of views for free viewpoint media using cameras with smaller fields of view and/or image sensors than would be possible using a single control point. Additionally or alternatively, the generation of virtual images that are not missing any image data using a single control point can be accomplished by positioning the camera closer to the center camera such that the person 202 appears closer to the middle of the captured real-world image and the amount of warping needs is reduced. However, this reduces the overall span across which different cameras may be distributed, which results in a smaller range of viewing angles to move between in the free viewpoint media. Thus, defining virtual camera parameters using the two separate control points as disclosed herein enables the generation of a wider range of views for free viewpoint media based on a larger separation or distribution of cameras used to capture real-world images as the basis for such views than is possible using similar cameras in conjunction with the single control point.

As shown in the illustrated example of FIG. 21, not only is the first cropped portion 2102 larger than the second cropped portion 2104, the first cropped portion 2102 is trapezoidal in shape while the second cropped portion 2104 is rectangular in shape. The trapezoidal shape is due to the need to warp the real-world image to generate the virtual image 2300 of FIG. 23 based on the rotation of the corresponding virtual camera relative to the real-world camera. As described above in connection with FIG. 20, the leftmost virtual camera 2002 is oriented in the same direction as the corresponding real-world camera 1002 of FIG. 10. That is, there is no rotation of the virtual camera 2002 relative to the real-world camera 1002. As a result, there is no need to warp the real-world image 2100 such that a direct rectangular cropping centered around the person 202 is sufficient to generate the virtual image 2300 of FIG. 23. Thus, using two control points to define virtual camera parameters as disclosed herein can simplify the process to increase processor efficiencies.

FIGS. 24-29 illustrate screenshots 2400, 2500, 2600, 200, 2800, 2900 of a free viewpoint video based on virtual images corresponding to the virtual cameras 2002-2030 shown in FIG. 20 defined using two separate control points including the ROI point 1810 (e.g., the location of the region of interest 1038) and the VIPR point 1904. The video represented in FIGS. 24-29 is similar to the video represented in FIGS. 11-16 in that the video begins at the first (leftmost) virtual camera 2002 of FIG. 20 and transitions across viewpoints associated with all of the virtual cameras 2002-2030 (and interpolated viewpoints) until reaching the viewpoint associated with the rightmost virtual camera 2030 at a midpoint of the video (e.g., at 5 seconds) before reversing the path of the viewpoints back to the first virtual camera 2002. However, unlike the video represented in FIGS. 11-16 that had abrupt changes in the view angle at certain points in the video (corresponding to non-smooth transitions between views associated with different ones of the arrays 1032, 1034, 1036 of cameras), the video represented in FIGS. 24-29 provides smooth transitions across all viewpoints included in the video. This is most clearly demonstrated in the figures by reference to the horizontal bar 1102 of the window frame 208 behind the person 202 in the video. As shown in the illustrated examples, the bar 1102 is at a progressively different angle in each screenshot 2400-2900 (separated by 1 second time spans) rather than remaining at a fixed angle for a period of time and suddenly jumping to a different angle as shown in FIGS. 11-16.

Figure 30:
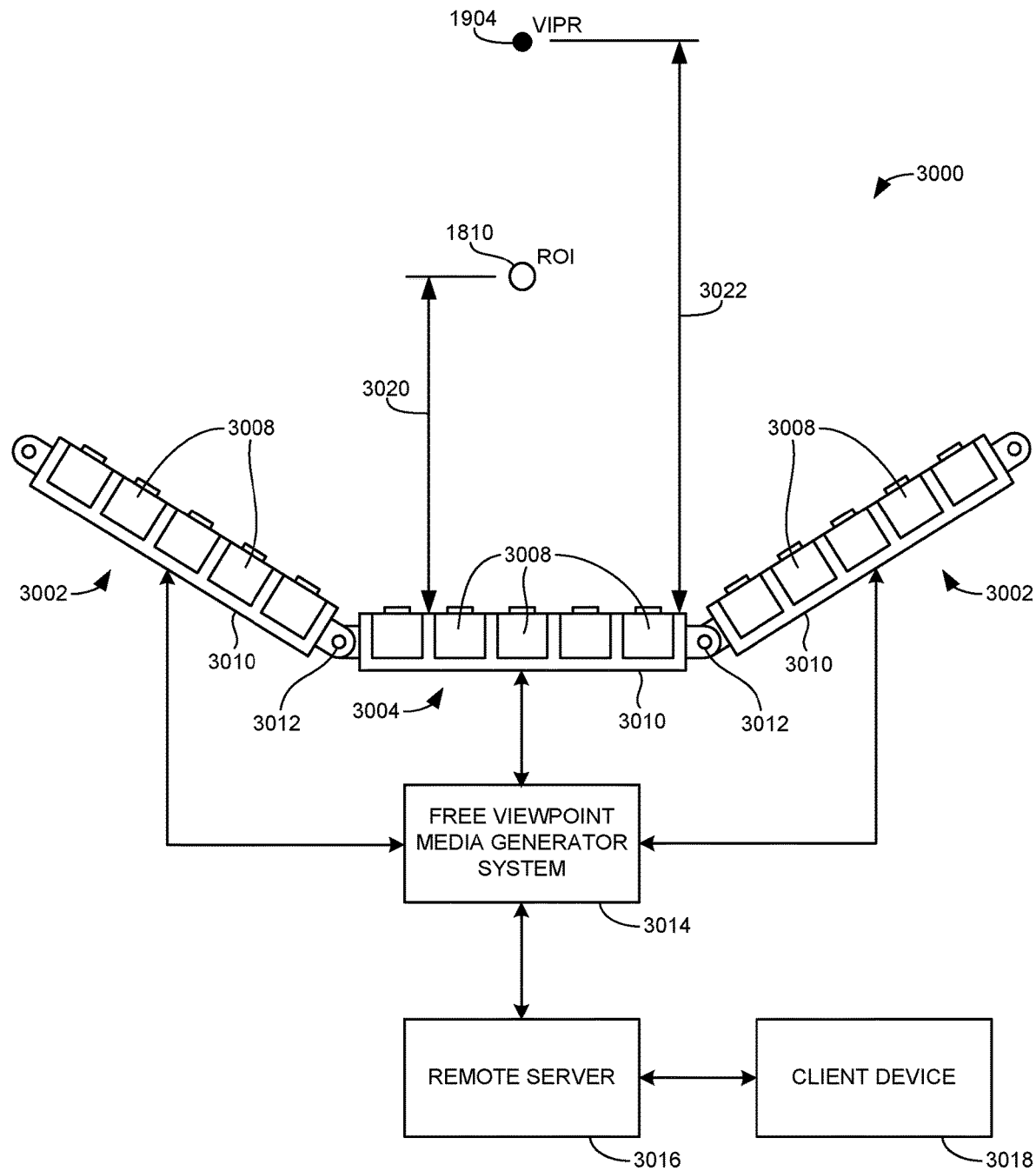
FIG. 30 illustrates an example system constructed in accordance with teachings disclosed herein to generate free viewpoint media.

FIG. 30 illustrates an example system 3000 constructed in accordance with teachings disclosed herein to generate free viewpoint media. The example system 3000 includes three arrays 3002, 3004, 3006 of cameras 3008 with each array including five cameras 3008. In this example, the cameras 3008 in each of the arrays 3002, 3004, 3006 are held in position relative to one another within a corresponding housing 3010. Further, in this example, the separate housings 3010 are coupled to one another via corresponding hinges 3012. However, examples disclosed herein are not limited to such particular arrangements but cover any suitable arrangement of cameras. For instance, in other examples, there may be more or fewer arrays than the three arrays 3002, 3004, 3006 shown in FIG. 30. Further, each array 3002, 3004, 3006 may include more or fewer cameras 3008 than the five shown. Further, in some examples, one or more of the arrays 3002, 3004, 3006 may be independently supported without being coupled to the adjacent arrays through the hinges 3012. Further, in some examples, individual cameras may be separately positioned without an associated housing or rigid structure securing the cameras to one another. Further, the separate cameras do not need to be in a line or arranged in a common plane but can be distributed in three-dimensional space. In short, examples disclosed herein may be implemented with any suitable number of cameras in any suitable arrangement so long as the spatial relationship of the cameras relative to one another is known or can be determined (e.g., through any suitable calibration process). Securing the cameras 3008 within corresponding housings 3010 and coupling the housings 3010 to one another as shown in the illustrated example facilitates the positioning of all cameras relative to one another.

As shown in the illustrated example, each of the cameras 3008 (e.g., through the corresponding housings 3010) are in communication with a free viewpoint media generator system 3014. In some examples, the free viewpoint media generator system 3014 corresponds to and/or is implemented by any suitable computing device (e.g., desktop computer, laptop computer, tablet, smartphone, etc.). In some examples, one or more of the cameras 3008 is incorporated into the same computing device as the free viewpoint media generator system 3014. Additionally or alternatively, in some examples, the free viewpoint media generator system 3014 is incorporated into one or more of the housings 3010 supporting the cameras 3008. In some examples, as shown in FIG. 30, the free viewpoint media generator system 3014 is in communication with a remote server 3016 (e.g., a cloud server) that performs post-processing on images captured by the cameras 3008 as controlled by the free viewpoint media generator system 3014. In some examples, the remote server 3016 is in communication with a separate client device 3018 at which a user may access and view the free viewpoint media provided by the remote server 3016. In some examples, the free viewpoint media generator system 3014 provides the free viewpoint media directly to the client device 3018. In some examples, the client device 3018 and the free viewpoint media generator system 3014 are associated with the same device.

Figure 31:
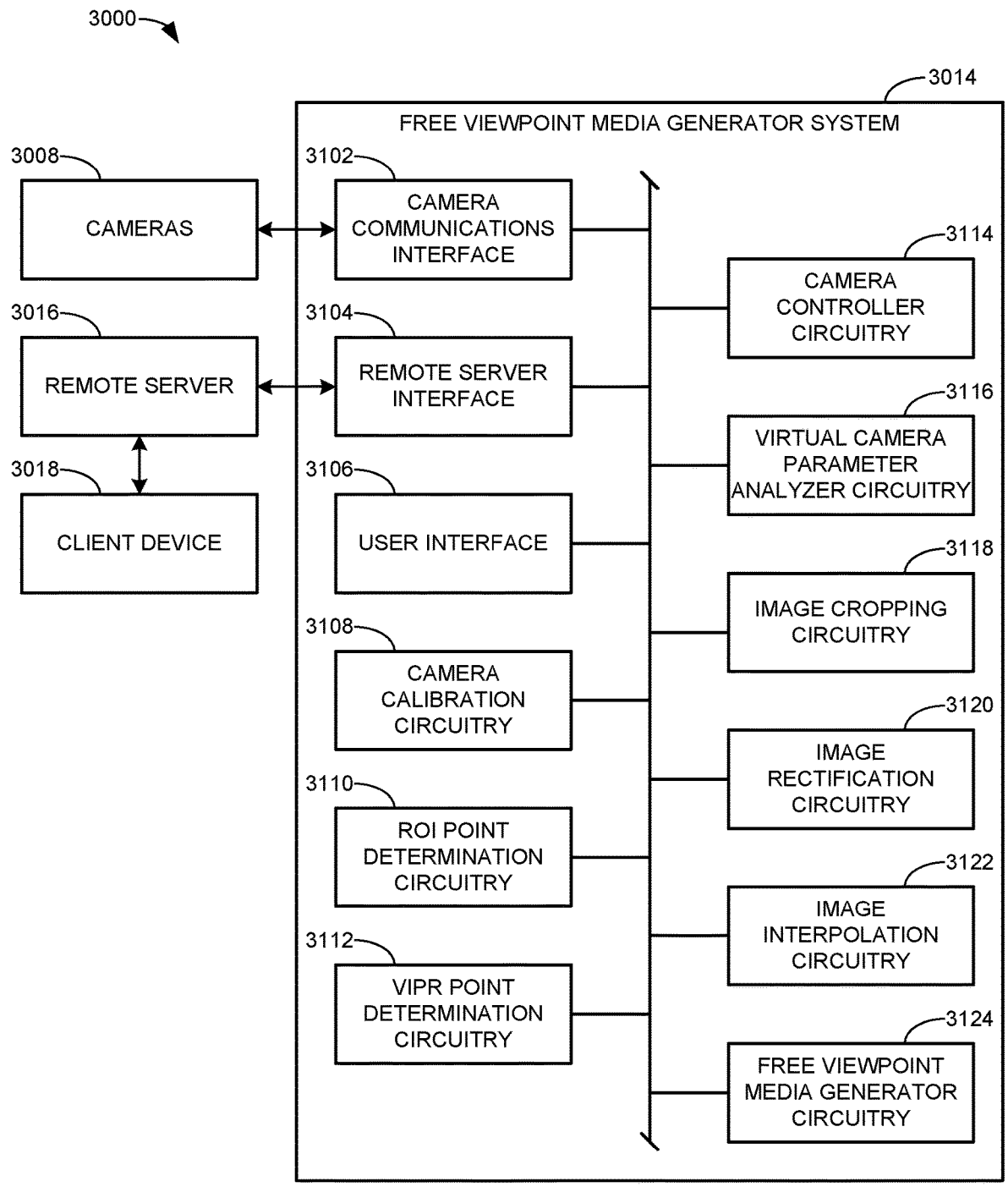
FIG. 31 is a block diagram of the example free viewpoint media generator system of FIG. 30.

FIG. 31 is a block diagram of the example system 3000 of FIG. 30 showing an example implementation of the example free viewpoint media generator system 3014. The free viewpoint media generator system 3014 of FIG. 31 may be instantiated (e.g., creating an instance of, bring into being for any length of time, materialize, implement, etc.) by processor circuitry such as a central processing unit executing instructions. Additionally or alternatively, the free viewpoint media generator system 3014 of FIG. 31 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 31 may, thus, be instantiated at the same or different times. Some or all of the circuitry may be instantiated, for example, in one or more threads executing concurrently on hardware and/or in series on hardware. Moreover, in some examples, some or all of the circuitry of FIG. 31 may be implemented by one or more virtual machines and/or containers executing on the microprocessor.

As shown in the illustrated example of FIG. 31, the free viewpoint media generator system 3014 includes a camera communications interface 3102 to enable communications with the cameras 3008. In this example, the free viewpoint media generator system 3014 also includes a remote server interface 3104 to enable communications with the remote server interface 3104. Further, in this example, the free viewpoint media generator system 3014 includes a user interface 3106 to enable a user to interact with the free viewpoint media generator system 3014. In some examples, the user interface 3106 is associated with one or more input devices (e.g., a mouse, a touchpad, a touchscreen, a keyboard, a microphone, etc.) to receive user inputs. Further, in some examples, the user interface 3106 is associated with one or more output devices (e.g., a display screen, speakers, etc.) to provide information (e.g., visual content, sounds, prompts, etc.) associated with the implementation of the system to a user. In some examples, one or more of the input devices and/or the output devices are incorporated into the free viewpoint media generator system 3014. In other examples, one or more of the input devices and/or the output devices are peripheral to the free viewpoint media generator system 3014.

As shown in FIG. 31, the example free viewpoint media generator system 3014 includes a camera calibration circuitry 3108 to calibrate the cameras 3008. Camera calibration involves the process of determining both internal parameters (e.g., optical parameters) and external parameters (e.g., position and orientation relative to the surrounding environment including the particular scene to be captured) of the cameras 3008. In some examples, the internal parameters are obtained directly from the cameras 3008 and/or the manufacturer of the cameras 3008 (e.g., internal parameters can be determined at the time of manufacture). In some examples, the external parameters are provided by a user (e.g., via the user interface 3106) that has positioned the cameras in a desired spatially relationship. In some examples, the camera calibration circuitry 3108 calculates the external parameters (e.g., the spatially relationship of the cameras relative to one another and the surrounding environment) using any suitable technique. In some examples, this calibration process is accomplished by the camera calibration circuitry 3108 analyzing images captured by the cameras 3008 that include particular markers (e.g., a checkerboard) positioned within the field of view of the cameras 3008. In some examples, the camera calibration circuitry 3108 performs dynamic calibration in which machine learning models are used to analyze images captured by the cameras 3008 of the surrounding environment without the need for placement of particular markers.

As shown in FIG. 31, the example free viewpoint media generator system 3014 includes a region of interest (ROI) point determination circuitry 3110 to determine the location of the ROI point 1810. As described above, the ROI point 1810 defines the location within three-dimensional space at which the gaze of free viewpoint media is to be focused as the media is moved between different views. That is, images captured by the cameras 3008 are to be asymmetrically cropped to position the ROI point 1810 at a fixed location across the various viewpoints in free viewpoint media. In some examples, the fixed location is the center of the various viewpoints. However, in other examples, the fixed location can be at any other location within the viewpoints. In some examples, the fixed location within the viewpoints where the region of interest is to appear is defined by user input. Further, in some examples, the ROI point determination circuitry 3110 determines the location of the ROI point 1810 within the real-world relative to the cameras 3008 (to enable the proper asymmetric cropping) based on user input. In some examples, to provide a user-friendly and intuitive user experience, the ROI point determination circuitry 3110 operates in conjunction with the user interface 3106 to prompt a user to align the region of interest (where the ROI point 1810 is to be located) with the center camera 3008 of the center array 3004. Once the user has positioned the region of interest relative to the cameras 3008, the ROI point determination circuitry 3110 prompts the user (via the user interface 3106) to specify a distance 3020 (shown in FIG. 30) from the center camera to the region of interest. Based on this distance 3020 (and the assumed position of the region of interest being aligned with the center camera) along with the spatial relationships of the cameras 3008 (as determined by the camera calibration circuitry 3108) the ROI point determination circuitry 3110 determines the position of the ROI point 1810 within three-dimensional space (e.g., relative to the position and orientation of the cameras 3008). In other examples, a user may provide other dimensions (e.g., lateral offsets) in situations where the region of interest is not assumed to be centered with the center camera. In other examples, the ROI point determination circuitry 3110 determines the location of the ROI point 1810 automatically based on object detection analysis of images captured within the fields of view of the cameras 3008.

As shown in FIG. 31, the example free viewpoint media generator system 3014 includes a virtual image plane rotation (VIPR) point determination circuitry 3112 to determine the location of the VIPR point 1904 within the three-dimensional environment towards which the cameras 3008 are facing. As described above, the VIPR point 1904 defines the parameters for virtual cameras to be simulated to generate different views for free viewpoint media. More particular, the VIPR point 1904 is the point in three-dimensional space through which the principal axis (e.g., the principal axis 1908 of FIG. 19) of a virtual camera (simulated as a perspective or pinhole camera) passes. In other words, the VIPR point 1904 defines the direction towards which the image plane of all virtual cameras are to face for the views in resulting free viewpoint media. The orientation of the virtual image plane defines the nature in which real-world images (captured by the real-world cameras 3008) are to be warped (e.g., through projection) to generate the views for free viewpoint media.

In some examples, the VIPR point determination circuitry 3112 determines the location of the VIPR point 1904 based on user input. In some examples, the VIPR point 1904 is assumed to be aligned with the ROI point 1810 and the center camera. In such examples, the location of the VIPR point 1904 can be defined by a user specifying a distance 3022 (shown in FIG. 30) from the center camera to the VIPR point 1904. In some examples, the distance 3022 can be any suitable value including infinity, in which case, the principal axis for each virtual camera would be parallel to the principal axis of every other virtual camera. In some examples, a user may provide additional dimensions (e.g., lateral offsets) to specify a location for the VIPR point 1904 that is offset from the center camera. In some examples, the free viewpoint media generator system 3014 determines the location of the VIPR point 1904 automatically based on the known spatial relationships of the cameras 3008 (e.g., as determined by the camera calibration circuitry 3108). More particularly, in some examples, the VIPR point determination circuitry 3112 determines the location of the VIPR point 1904 so as to reduce the amount of rotation of simulated virtual cameras relative to their corresponding real-world cameras (e.g., the cameras 3008). Reducing the amount of rotation can enhance (e.g., optimize) image quality by reducing the amount of warping to generate the virtual images corresponding to the views of free viewpoint media as well as reducing the amount of blur that may be included in such images because of the shape and position of the cropped portions of the real-world images needed to generate the virtual images. Furthermore, the smaller size of the cropped portions of the real-world images also reduces the amount of data to be processed when generating the free viewpoint media, thereby providing memory, bandwidth, and/or processing efficiencies. In some examples, as described above in connection with FIG. 20, the VIPR point determination circuitry 3112 determines the location of the VIPR point 1904 as a point on the principal axes of the outermost cameras (e.g., the point of intersection of the principal axes 1042, 1046 as shown in FIG. 20).

Once the spatial relationships of the cameras 3008 are determined and the locations of the ROI point 1810 and the VIPR point 1904 are defined, the free viewpoint media generator system 3014 implements a camera controller circuitry 3114 to control the operation of the cameras 3008 to synchronize a timing of when images (either still shots or video) are captured by the cameras 3008.

As shown in FIG. 31, the example free viewpoint media generator system 3014 includes an example virtual camera parameter analyzer circuitry 3116 to determine parameters for virtual cameras. As discussed above, the virtual camera parameters are determined based on two control points corresponding to the ROI point 1810 and the VIPR point 1904. Specifically, the VIPR point 1904 defines the rotation or orientation of the image plane (e.g., the image plane 1906 of FIG. 19) of a virtual camera. The ROI point 1810 defines the boundaries of the cropped portion of a real-world image so as to position a region of interest at a desired location at which the gaze of various views of free viewpoint media is fixed (e.g., the point about which different ones of the views appear to pivot).

The example free viewpoint media generator system 3014 includes an example image cropping circuitry 3118 to generate cropped images corresponding to portions of the full frame images captured by the cameras 3008. As noted above, the particular cropped portion (e.g., the portion 1914 in FIG. 19) of a given real-world image is defined based on the virtual camera parameters for a corresponding virtual camera as determined by the virtual camera parameter analyzer circuitry 3116. The example free viewpoint media generator system 3014 includes an example image rectification circuitry 3120 to rectify or warp the cropped portions of the real-world images into the final views for the free viewpoint media. Further, in some examples, the free viewpoint media generator system 3014 includes an example image interpolation circuitry 3122 to generate interpolated images between the cropped and warped images corresponding to the real-world images initially captured by the real-world cameras 3008. In some examples, a free viewpoint media generator circuitry 3124 combines the initial cropped and warped images as well as the interpolated images to generate free viewpoint media.

The operation and/or functionality of the example image cropping circuitry 3118, the example image rectification circuitry 3120, the example image interpolation circuitry 3122, and the example free viewpoint media generator circuitry 3124 may be implemented using any suitable technique for generating free viewpoint media that is now known or later developed. That is, the particular processes and/or algorithms involved in generating virtual images from real-world images can be based on and take advantage of existing techniques and/or the advantages of techniques that may be later developed. However, unlike existing techniques, examples disclosed herein offer the additional advantages of improving image quality while increasing computer efficiencies because virtual camera parameters are defined by two separate control points to enable smoother transitions between views in free viewpoint media than is possible with existing approaches while also fixing the gaze of the views at a desired region of interest.

In some examples, some or all of the operations and/or functionalities of the example image cropping circuitry 3118, the example image rectification circuitry 3120, the example image interpolation circuitry 3122, and the example free viewpoint media generator circuitry 3124 are implemented by the remote server 3016 in communication with the free viewpoint media generator system 3014. For instance, in some examples, the free viewpoint media generator system 3014 may provide the initial images as captured by the real-world cameras 3008 to the remote server 3016 along with metadata defining the virtual camera parameters (determined by the virtual camera parameter analyzer circuitry 3116) and all subsequent processing is performed by the remote server 3016. In such examples, the image cropping circuitry 3118, the image rectification circuitry 3120, the image interpolation circuitry 3122, and the free viewpoint media generator circuitry 3124 are omitted from the free viewpoint media generator system 3014. In other examples, only some of the image cropping circuitry 3118, the image rectification circuitry 3120, the image interpolation circuitry 3122, and the free viewpoint media generator circuitry 3124 are omitted from the free viewpoint media generator system 3014. In other examples, one or more of the image cropping circuitry 3118, the image rectification circuitry 3120, the image interpolation circuitry 3122, and the free viewpoint media generator circuitry 3124 is implemented in the free viewpoint media generator system 3014 but operates in conjunction with and/or relies on processing of the remote server 3016 to implement their respective functions and/or operations.

In some examples, the free viewpoint media generator system 3014 includes means for calibrating cameras. For example, the means for calibrating may be implemented by the camera calibration circuitry 3108. In some examples, the camera calibration circuitry 3108 may be instantiated by processor circuitry such as the example processor circuitry 3312 of FIG. 33. For instance, the camera calibration circuitry 3108 may be instantiated by the example general purpose processor circuitry 3400 of FIG. 34 executing machine executable instructions such as that implemented by at least blocks 3202 of FIG. 32. In some examples, the camera calibration circuitry 3108 may be instantiated by hardware logic circuitry, which may be implemented by an ASIC or the FPGA circuitry 3500 of FIG. 35 structured to perform operations corresponding to the machine readable instructions. Additionally or alternatively, the camera calibration circuitry 3108 may be instantiated by any other combination of hardware, software, and/or firmware. For example, the camera calibration circuitry 3108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for determining the location of the ROI point 1810. For example, the means for determining may be implemented by the ROI point determination circuitry 3110. In some examples, the ROI point determination circuitry 3110 may be instantiated by processor circuitry such as the example processor circuitry 3312 of FIG. 33. For instance, the ROI point determination circuitry 3110 may be instantiated by the example general purpose processor circuitry 3400 of FIG. 34 executing machine executable instructions such as that implemented by at least blocks 3204 of FIG. 32. In some examples, the ROI point determination circuitry 3110 may be instantiated by hardware logic circuitry, which may be implemented by an ASIC or the FPGA circuitry 3500 of FIG. 35 structured to perform operations corresponding to the machine readable instructions. Additionally or alternatively, the ROI point determination circuitry 3110 may be instantiated by any other combination of hardware, software, and/or firmware. For example, the ROI point determination circuitry 3110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for determining the location of the VIPR point 1904. For example, the means for determining may be implemented by the VIPR point determination circuitry 3112. In some examples, the VIPR point determination circuitry 3112 may be instantiated by processor circuitry such as the example processor circuitry 3312 of FIG. 33. For instance, the VIPR point determination circuitry 3112 may be instantiated by the example general purpose processor circuitry 3400 of FIG. 34 executing machine executable instructions such as that implemented by at least blocks 3206 of FIG. 32. In some examples, the VIPR point determination circuitry 3112 may be instantiated by hardware logic circuitry, which may be implemented by an ASIC or the FPGA circuitry 3500 of FIG. 35 structured to perform operations corresponding to the machine readable instructions. Additionally or alternatively, the VIPR point determination circuitry 3112 may be instantiated by any other combination of hardware, software, and/or firmware. For example, the VIPR point determination circuitry 3112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for determining parameters for virtual cameras (e.g., the virtual cameras 2002-2030. For example, the means for determining may be implemented by the virtual camera parameter analyzer circuitry 3116. In some examples, the virtual camera parameter analyzer circuitry 3116 may be instantiated by processor circuitry such as the example processor circuitry 3312 of FIG. 33. For instance, the virtual camera parameter analyzer circuitry 3116 may be instantiated by the example general purpose processor circuitry 3400 of FIG. 34 executing machine executable instructions such as that implemented by at least blocks 3208 of FIG. 32. In some examples, the virtual camera parameter analyzer circuitry 3116 may be instantiated by hardware logic circuitry, which may be implemented by an ASIC or the FPGA circuitry 3500 of FIG. 35 structured to perform operations corresponding to the machine readable instructions. Additionally or alternatively, the virtual camera parameter analyzer circuitry 3116 may be instantiated by any other combination of hardware, software, and/or firmware. For example, the virtual camera parameter analyzer circuitry 3116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for controlling the cameras 3008. For example, the means for controlling may be implemented by the camera controller circuitry 3114. In some examples, the camera controller circuitry 3114 may be instantiated by processor circuitry such as the example processor circuitry 3312 of FIG. 33. For instance, the camera controller circuitry 3114 may be instantiated by the example general purpose processor circuitry 3400 of FIG. 34 executing machine executable instructions such as that implemented by at least blocks 3210 of FIG. 32. In some examples, the camera controller circuitry 3114 may be instantiated by hardware logic circuitry, which may be implemented by an ASIC or the FPGA circuitry 3500 of FIG. 35 structured to perform operations corresponding to the machine readable instructions. Additionally or alternatively, the camera controller circuitry 3114 may be instantiated by any other combination of hardware, software, and/or firmware. For example, the camera controller circuitry 3114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for cropping images. For example, the means for cropping may be implemented by the image cropping circuitry 3118. In some examples, the image cropping circuitry 3118 may be instantiated by processor circuitry such as the example processor circuitry 3312 of FIG. 33. For instance, the image cropping circuitry 3118 may be instantiated by the example general purpose processor circuitry 3400 of FIG. 34 executing machine executable instructions such as that implemented by at least blocks 3214 of FIG. 32. In some examples, the image cropping circuitry 3118 may be instantiated by hardware logic circuitry, which may be implemented by an ASIC or the FPGA circuitry 3500 of FIG. 35 structured to perform operations corresponding to the machine readable instructions. Additionally or alternatively, the image cropping circuitry 3118 may be instantiated by any other combination of hardware, software, and/or firmware. For example, the image cropping circuitry 3118 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for warping images. For example, the means for warping may be implemented by the image rectification circuitry 3120. In some examples, the image rectification circuitry 3120 may be instantiated by processor circuitry such as the example processor circuitry 3312 of FIG. 33. For instance, the image rectification circuitry 3120 may be instantiated by the example general purpose processor circuitry 3400 of FIG. 34 executing machine executable instructions such as that implemented by at least blocks 3218 of FIG. 32. In some examples, the image rectification circuitry 3120 may be instantiated by hardware logic circuitry, which may be implemented by an ASIC or the FPGA circuitry 3500 of FIG. 35 structured to perform operations corresponding to the machine readable instructions. Additionally or alternatively, the image rectification circuitry 3120 may be instantiated by any other combination of hardware, software, and/or firmware. For example, the image rectification circuitry 3120 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for generating interpolated images. For example, the means for generating may be implemented by the image interpolation circuitry 3122. In some examples, the image interpolation circuitry 3122 may be instantiated by processor circuitry such as the example processor circuitry 3312 of FIG. 33. For instance, the image interpolation circuitry 3122 may be instantiated by the example general purpose processor circuitry 3400 of FIG. 34 executing machine executable instructions such as that implemented by at least blocks 3222 of FIG. 32. In some examples, the image interpolation circuitry 3122 may be instantiated by hardware logic circuitry, which may be implemented by an ASIC or the FPGA circuitry 3500 of FIG. 35 structured to perform operations corresponding to the machine readable instructions. Additionally or alternatively, the image interpolation circuitry 3122 may be instantiated by any other combination of hardware, software, and/or firmware. For example, the image interpolation circuitry 3122 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the free viewpoint media generator system 3014 includes means for generating free viewpoint media. For example, the means for generating may be implemented by the free viewpoint media generator circuitry 3124. In some examples, the free viewpoint media generator circuitry 3124 may be instantiated by processor circuitry such as the example processor circuitry 3312 of FIG. 33. For instance, the free viewpoint media generator circuitry 3124 may be instantiated by the example general purpose processor circuitry 3400 of FIG. 34 executing machine executable instructions such as that implemented by at least blocks 3226 of FIG. 32. In some examples, the free viewpoint media generator circuitry 3124 may be instantiated by hardware logic circuitry, which may be implemented by an ASIC or the FPGA circuitry 3500 of FIG. 35 structured to perform operations corresponding to the machine readable instructions. Additionally or alternatively, the free viewpoint media generator circuitry 3124 may be instantiated by any other combination of hardware, software, and/or firmware. For example, the free viewpoint media generator circuitry 3124 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example free viewpoint media generator system 3014 of FIG. 30 is illustrated in FIG. 31, one or more of the elements, processes, and/or devices illustrated in FIG. 31 may be combined, divided, re-arranged, omitted, eliminated, and/or implemented in any other way. Further, the example camera communications interface 3102, the example remote serve interface 3104, the example user interface 3106, the example camera calibration circuitry 3108, the example ROI point determination circuitry 3110, the example VIPR point determination circuitry 3112, the example camera controller circuitry 3114, the example virtual camera parameter analyzer circuitry 3116, the example image cropping circuitry 3118, the example image rectification circuitry 3120, the example image interpolation circuitry 3122, the example free viewpoint media generator circuitry 3124, and/or, more generally, the example free viewpoint media generator system 3014 of FIG. 30, may be implemented by hardware alone or by hardware in combination with software and/or firmware. Thus, for example, any of the example camera communications interface 3102, the example remote serve interface 3104, the example user interface 3106, the example camera calibration circuitry 3108, the example ROI point determination circuitry 3110, the example VIPR point determination circuitry 3112, the example camera controller circuitry 3114, the example virtual camera parameter analyzer circuitry 3116, the example image cropping circuitry 3118, the example image rectification circuitry 3120, the example image interpolation circuitry 3122, the example free viewpoint media generator circuitry 3124, and/or, more generally, the example free viewpoint media generator system 3014, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example free viewpoint media generator system 3014 of FIG. 30 may include one or more elements, processes, and/or devices in addition to, or instead of, those illustrated in FIG. 31, and/or may include more than one of any or all of the illustrated elements, processes, and devices.

Figure 32:
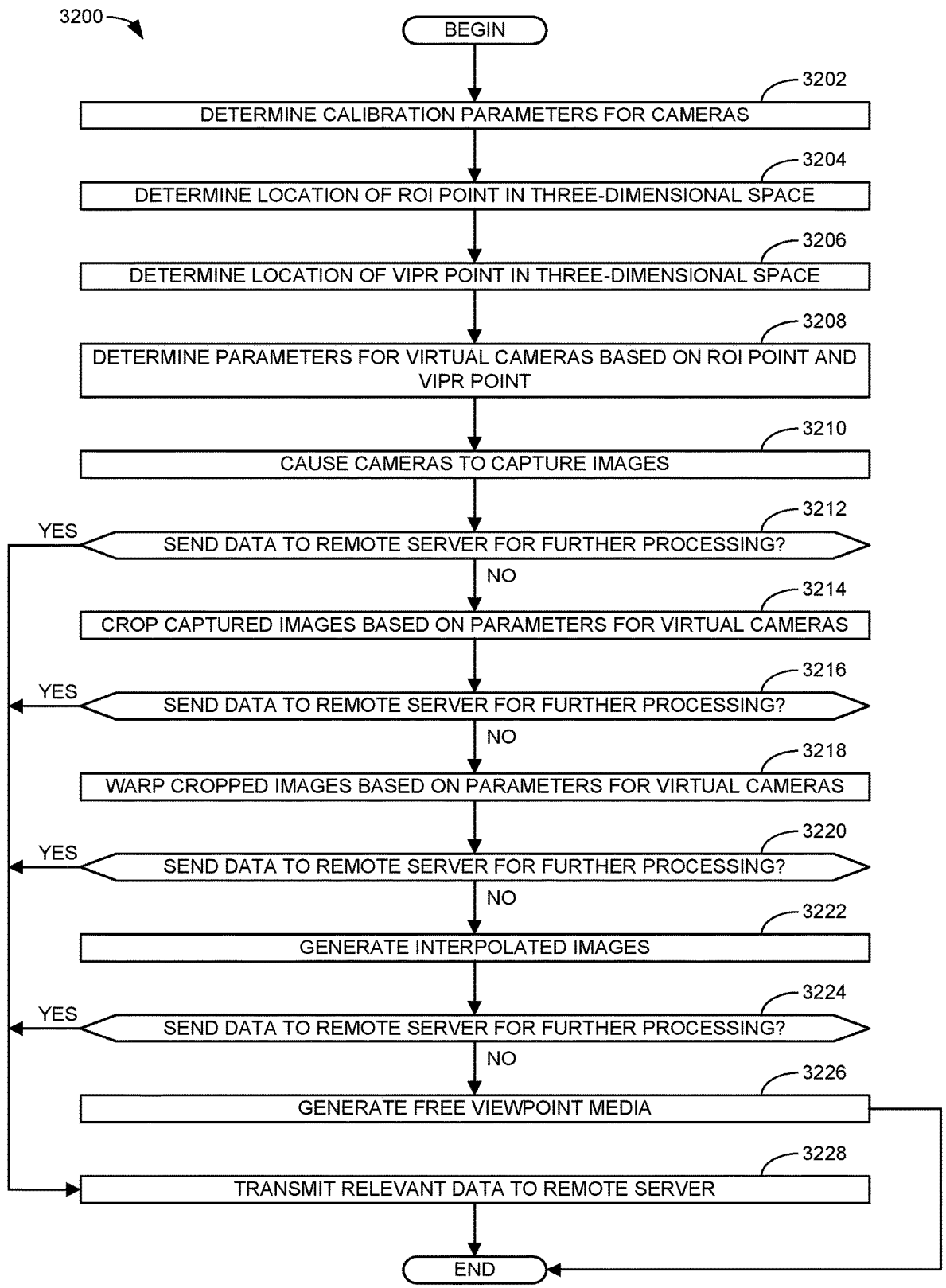
FIG. 32 is a flowchart representative of example machine readable instructions and/or example operations that may be executed by example processor circuitry to implement the free viewpoint media generator system of FIG. 31.

A flowchart representative of example hardware logic circuitry, machine readable instructions, hardware implemented state machines, and/or any combination thereof for implementing the example free viewpoint media generator system 3014 of FIG. 31 is shown in FIG. 32. The machine readable instructions may be one or more executable programs or portion(s) of an executable program for execution by processor circuitry, such as the processor circuitry 3312 shown in the example processor platform 3300 discussed below in connection with FIG. 33 and/or the example processor circuitry discussed below in connection with FIGS. 34 and/or 35. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 32, many other methods of implementing the example free viewpoint media generator system 3014 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 32 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 32 is a flowchart representative of example machine readable instructions and/or example operations 3200 that may be executed and/or instantiated by processor circuitry to generate free viewpoint media. The machine readable instructions and/or the operations 3200 of FIG. 32 begin at block 3202, at which the example camera calibration circuitry 3108 determines calibration parameters for cameras. The calibration parameters include the spatial relationship of the cameras relative to one another and relative to the three-dimensional real-world environment surrounding the cameras. At block 3204, the example ROI point determination circuitry 3110 determines the location of the ROI point 1810 in three-dimensional space. That is, the ROI point determination circuitry 3110 determines the location of a region of interest within the real-world scene to be imaged by the cameras that is to be the focal point or pivot point for the gaze of different views in the free viewpoint media to be generated. In some examples, the location of the ROI point 1810 is based on user input. In some examples, the location of the ROI point 1810 is determined based on image analysis of images captured by the cameras.

At block 3206, the example VIPR point determination circuitry 3112 determines the location of the VIPR point 1904 in three-dimensional space. In some examples, the location of the VIPR point 1904 is defined based on user input. In some examples, the VIPR point 1904 is automatically determined to reduce (e.g., minimize) the amount of rotation of virtual cameras relative to corresponding real-world cameras 3008. Determining the location of the VIPR point 1904 that reduces the amount of such rotation serves to improve image quality of resulting free viewpoint media and can also provide efficiencies in the storage, transmission, and/or processing of the images captured by the cameras 3008 and used as the basis for generating the free viewpoint media.

At block 3208, the example virtual camera parameter analyzer circuitry 3116 determines parameters for virtual cameras based on the ROI point 1810 and the VIPR point 1904. That is, the virtual camera parameter analyzer circuitry 3116 determines the orientation and intrinsic parameters for simulated cameras to be defined as the basis for generated images that serve as different views in the free viewpoint media. The virtual camera parameter analyzer circuitry 3116 determines the parameters for the virtual cameras based on the ROI point 1810 and the VIPR point (which are independently set or determined as outlined above) to enable smooth transitions between all views in the free viewpoint media while also fixing the gaze of such views on the region of interest in the real-world scene being imaged by the real-world cameras 3008.

At block 3210, the example camera controller circuitry 3114 causes the cameras 3008 to capture images. In some examples, the images captured correspond to still shots at a specific point in time. In other examples, the images correspond to a video that includes multiple image frames captured over time. In some examples, the camera controller circuitry 3114 synchronizes the operations of the cameras 3008 so that each of the cameras capture images concurrently.

At block 3212, the example free viewpoint media generator system 3014 determines whether to send data to a remote server (e.g., the remote server 3016) for further processing. If so, control advances to block 3228 where the example remote server interface 3104 transmits the relevant data to the remote server 3016. If block 3228 is arrived at through block 3212, the relevant data includes the images captured by the cameras 3008 (at block 3210) as well as the parameters for the virtual cameras (determined at block 3208). Based on this information, the remote server 3016 can determine how to crop and warp the captured images according to the virtual camera parameters and complete the rest of the process detailed in blocks 3214, 3218, 3222, and 3226. If the example free viewpoint media generator system 3014 determines not to send data to the remote server 3016 at block 3212, control advances to block 3214.

At block 3214, the example image cropping circuitry 3118 crops the captured images based on the parameters for the virtual cameras. More particularly, in some examples, the image cropping circuitry 3118 crops the captured images to a portion that can be projected onto a virtual image plane of a corresponding virtual camera (defined based on the VIPR point 1904) and that positions the region of interest within the real-world scene at the center (or other suitable location) of the resulting image (based on the ROI point 1810).

At block 3216, the example free viewpoint media generator system 3014 determines whether to send data to a remote server 3016 for further processing. If so, control advances to block 3228 where the example remote server interface 3104 transmits the relevant data to the remote server 3016. If block 3228 is arrived at through block 3216, the relevant data includes the cropped images (generated at block 3214) as well as the parameters for the virtual cameras (determined at block 3208). Based on this information, the remote server 3016 can determine how to warp the cropped images according to the virtual camera parameters and complete the rest of the process detailed in blocks 3218, 3222, and 3226. If the example free viewpoint media generator system 3014 determines not to send data to the remote server 3016 at block 3216, control advances to block 3218.

At block 3218, the example image rectification circuitry 3120 warps the cropped images based on a projective transformation defined by the parameters for the virtual cameras. More particularly, in some examples, the warping is based on a projection of the cropped portion of a real-world image onto the virtual image plane of a corresponding virtual camera having an orientation defined by the VIPR point 1904.

At block 3220, the example free viewpoint media generator system 3014 determines whether to send data to a remote server 3016 for further processing. If so, control advances to block 3228 where the example remote server interface 3104 transmits the relevant data to the remote server 3016. If block 3228 is arrived at through block 3218, the relevant data includes the warped images (generated at block 3218), which correspond to ones of the final views in the free viewpoint media. At this point in this process, it is no longer necessary to transmit the parameters for the virtual cameras (determined at block 3208) because they are not needed for subsequent processing. If the example free viewpoint media generator system 3014 determines not to send data to the remote server 3016 at block 3220, control advances to block 3222.

At block 3222, the example image interpolation circuitry 3122 generates interpolated images. The interpolated images can be generated using any suitable technique now known or later developed. For instance, in some examples, the image interpolation circuitry 3122 calculated the optical flow of pixels between different pairs of virtual images corresponding to adjacent views of the real-world scene captured by the real-world cameras 3008. Then, based on the optical flow calculations, one or more intermediate views between the pair of virtual images are generated through interpolation.

At block 3224, the example free viewpoint media generator system 3014 determines whether to send data to a remote server 3016 for further processing. If so, control advances to block 3228 where the example remote server interface 3104 transmits the relevant data to the remote server 3016. If block 3228 is arrived at through block 3222, the relevant data includes the warped images (generated at block 3218), which correspond to ones of the final views in the free viewpoint media. Further, the relevant data includes the interpolated images (generated at block 3222). If the example free viewpoint media generator system 3014 determines not to send data to the remote server 3016 at block 3222, control advances to block 3226.

At block 3226, the example free viewpoint media generator circuitry 3124 generates free viewpoint media. In some examples, the free viewpoint media is defined by both the views corresponding to the cropped and warped images as well as the intermediate views corresponding to the interpolated images. Thereafter, the example program of FIG. 32 ends. As shown in the illustrated example, if at any time in the process it is determined to provide data to the remote server 3016 (e.g., controlled advances to block 3228), the program thereafter ends because subsequent processing is performed by the remote server 3016. The decision blocks 3212, 3216, 3220, and 3224 are provided in the flowchart of FIG. 32 to identify different example points in the process at which the free viewpoint media generator circuitry 3124 passes off data to a remote server 3016 for further processing. In some examples, the particular point in the process at which this occurs is fixed such that the decision blocks 3212, 3216, 3220, and 3224 may be omitted and the process automatically advances to block 3228 at the particular point in the process. Further, in such examples, the operations after the particular point in the process (e.g., anyone of blocks 3214, 3218, 3222, 3226) may also be omitted because such operations would be performed by the remote server 3016 instead of by the free viewpoint media generator system 3014. In other examples, the free viewpoint media generator system 3014 may send data to the remote server 3016 to process some data while the free viewpoint media generator system 3014 continues to process other data.

Figure 33:
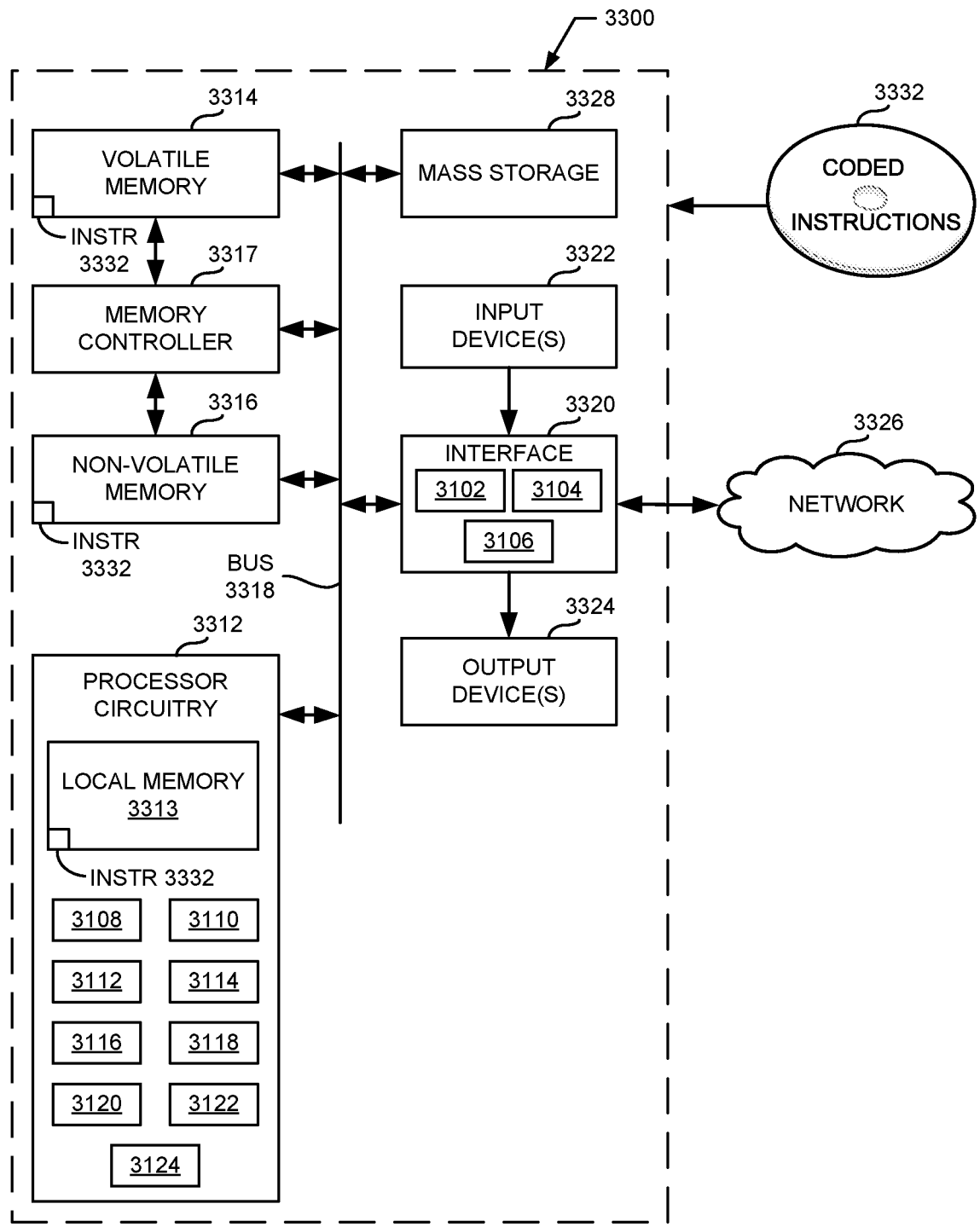
FIG. 33 is a block diagram of an example processing platform including processor circuitry structured to execute the example machine readable instructions and/or the example operations of FIG. 32 to implement the free viewpoint media generator system of FIG. 31.

FIG. 33 is a block diagram of an example processor platform 3300 structured to execute and/or instantiate the machine readable instructions and/or the operations of FIG. 32 to implement the free viewpoint media generator system 3014 of FIG. 31. The processor platform 3300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 3300 of the illustrated example includes processor circuitry 3312. The processor circuitry 3312 of the illustrated example is hardware. For example, the processor circuitry 3312 can be implemented by one or more integrated circuits, logic circuits, FPGAs, microprocessors, CPUs, GPUs, DSPs, and/or microcontrollers from any desired family or manufacturer. The processor circuitry 3312 may be implemented by one or more semiconductor based (e.g., silicon based) devices. In this example, the processor circuitry 3312 implements the example camera calibration circuitry 3108, the example ROI point determination circuitry 3110, the example VIPR point determination circuitry 3112, the example camera controller circuitry 3114, the example virtual camera parameter analyzer circuitry 3116, the example image cropping circuitry 3118, the example image rectification circuitry 3120, the example image interpolation circuitry 3122, and the example free viewpoint media generator circuitry 3124.

The processor circuitry 3312 of the illustrated example includes a local memory 3313 (e.g., a cache, registers, etc.). The processor circuitry 3312 of the illustrated example is in communication with a main memory including a volatile memory 3314 and a non-volatile memory 3316 by a bus 3318. The volatile memory 3314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 3316 may be implemented by flash memory and/or any other desired type of memory device. Access to the main memory 3314, 3316 of the illustrated example is controlled by a memory controller 3317.

The processor platform 3300 of the illustrated example also includes interface circuitry 3320. The interface circuitry 3320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 3322 are connected to the interface circuitry 3320. The input device(s) 3322 permit(s) a user to enter data and/or commands into the processor circuitry 3312. The input device(s) 3322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 3324 are also connected to the interface circuitry 3320 of the illustrated example. The output device(s) 3324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 3320 of the illustrated example, thus, typically includes a graphics driver card, a graphics driver chip, and/or graphics processor circuitry such as a GPU.

The interface circuitry 3320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 3326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 3300 of the illustrated example also includes one or more mass storage devices 3328 to store software and/or data. Examples of such mass storage devices 3328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 3332, which may be implemented by the machine readable instructions of FIG. 32, may be stored in the mass storage device 3328, in the volatile memory 3314, in the non-volatile memory 3316, and/or on a removable non-transitory computer readable storage medium such as a CD or DVD.

Figure 34:
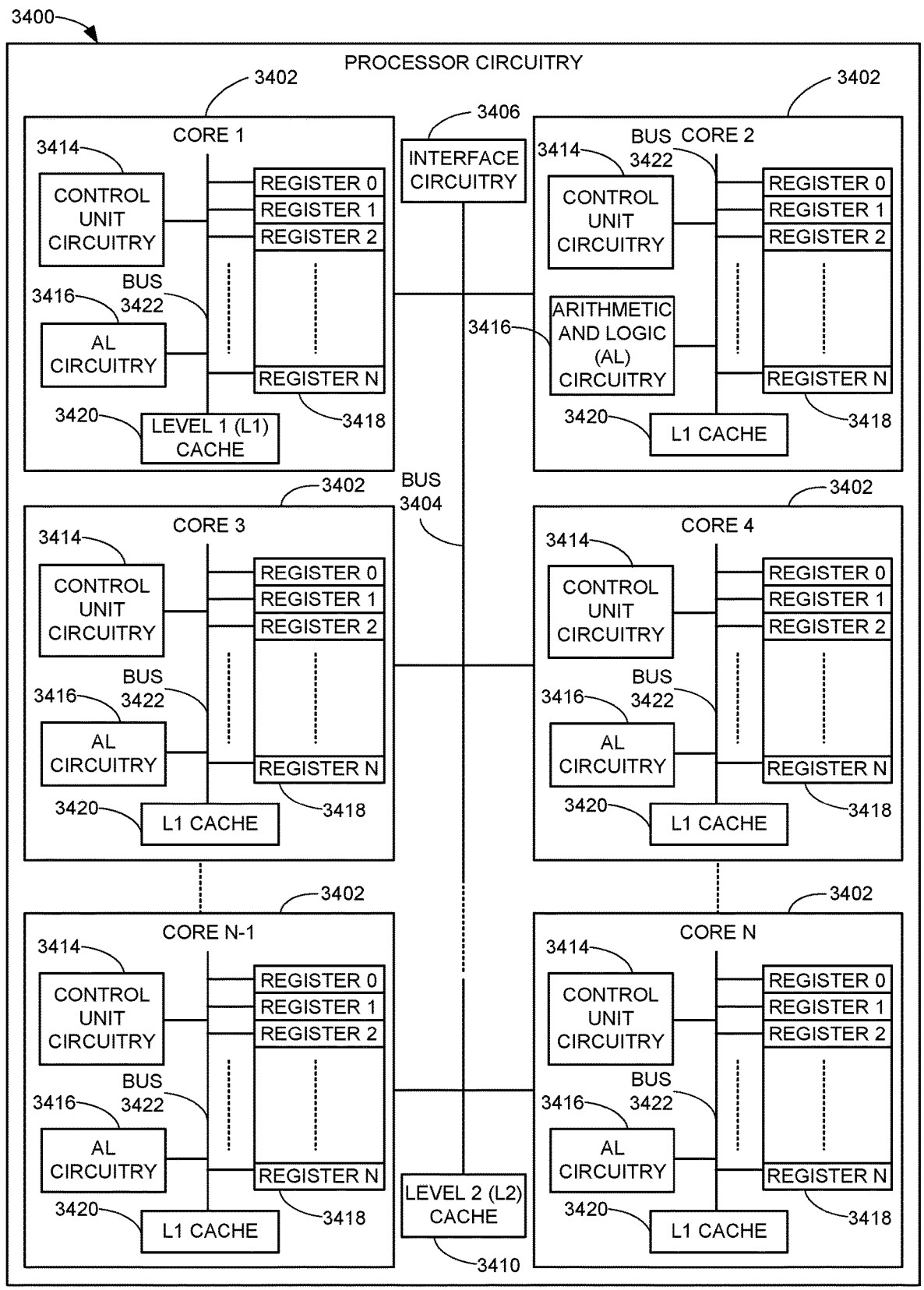
FIG. 34 is a block diagram of an example implementation of the processor circuitry of FIG. 33.

FIG. 34 is a block diagram of an example implementation of the processor circuitry 3312 of FIG. 33. In this example, the processor circuitry 3312 of FIG. 33 is implemented by a general purpose microprocessor 3400. The general purpose microprocessor circuitry 3400 executes some or all of the machine readable instructions of the flowchart of FIG. 32 to effectively instantiate the circuitry of FIG. 31 as logic circuits to perform the operations corresponding to those machine readable instructions. In some such examples, the circuitry of FIG. 31 is instantiated by the hardware circuits of the microprocessor 3400 in combination with the instructions. For example, the microprocessor 3400 may implement multi-core hardware circuitry such as a CPU, a DSP, a GPU, an XPU, etc. Although it may include any number of example cores 3402 (e.g., 1 core), the microprocessor 3400 of this example is a multi-core semiconductor device including N cores. The cores 3402 of the microprocessor 3400 may operate independently or may cooperate to execute machine readable instructions. For example, machine code corresponding to a firmware program, an embedded software program, or a software program may be executed by one of the cores 3402 or may be executed by multiple ones of the cores 3402 at the same or different times. In some examples, the machine code corresponding to the firmware program, the embedded software program, or the software program is split into threads and executed in parallel by two or more of the cores 3402. The software program may correspond to a portion or all of the machine readable instructions and/or operations represented by the flowchart of FIG. 32.

The cores 3402 may communicate by a first example bus 3404. In some examples, the first bus 3404 may implement a communication bus to effectuate communication associated with one(s) of the cores 3402. For example, the first bus 3404 may implement at least one of an Inter-Integrated Circuit (I2C) bus, a Serial Peripheral Interface (SPI) bus, a PCI bus, or a PCIe bus. Additionally or alternatively, the first bus 3404 may implement any other type of computing or electrical bus. The cores 3402 may obtain data, instructions, and/or signals from one or more external devices by example interface circuitry 3406. The cores 3402 may output data, instructions, and/or signals to the one or more external devices by the interface circuitry 3406. Although the cores 3402 of this example include example local memory 3420 (e.g., Level 1 (L1) cache that may be split into an L1 data cache and an L1 instruction cache), the microprocessor 3400 also includes example shared memory 3410 that may be shared by the cores (e.g., Level 2 (L2_cache)) for high-speed access to data and/or instructions. Data and/or instructions may be transferred (e.g., shared) by writing to and/or reading from the shared memory 3410. The local memory 3420 of each of the cores 3402 and the shared memory 3410 may be part of a hierarchy of storage devices including multiple levels of cache memory and the main memory (e.g., the main memory 3314, 3316 of FIG. 33). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 3402 may be referred to as a CPU, DSP, GPU, etc., or any other type of hardware circuitry. Each core 3402 includes control unit circuitry 3414, arithmetic and logic (AL) circuitry (sometimes referred to as an ALU) 3416, a plurality of registers 3418, the L1 cache 3420, and a second example bus 3422. Other structures may be present. For example, each core 3402 may include vector unit circuitry, single instruction multiple data (SIMD) unit circuitry, load/store unit (LSU) circuitry, branch/jump unit circuitry, floating-point unit (FPU) circuitry, etc. The control unit circuitry 3414 includes semiconductor-based circuits structured to control (e.g., coordinate) data movement within the corresponding core 3402. The AL circuitry 3416 includes semiconductor-based circuits structured to perform one or more mathematic and/or logic operations on the data within the corresponding core 3402. The AL circuitry 3416 of some examples performs integer based operations. In other examples, the AL circuitry 3416 also performs floating point operations. In yet other examples, the AL circuitry 3416 may include first AL circuitry that performs integer based operations and second AL circuitry that performs floating point operations. In some examples, the AL circuitry 3416 may be referred to as an Arithmetic Logic Unit (ALU). The registers 3418 are semiconductor-based structures to store data and/or instructions such as results of one or more of the operations performed by the AL circuitry 3416 of the corresponding core 3402. For example, the registers 3418 may include vector register(s), SIMD register(s), general purpose register (s), flag register(s), segment register(s), machine specific register(s), instruction pointer register(s), control register(s), debug register(s), memory management register(s), machine check register(s), etc. The registers 3418 may be arranged in a bank as shown in FIG. 34. Alternatively, the registers 3418 may be organized in any other arrangement, format, or structure including distributed throughout the core 3402 to shorten access time. The second bus 3422 may implement at least one of an I2C bus, a SPI bus, a PCI bus, or a PCIe bus Each core 3402 and/or, more generally, the microprocessor 3400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 3400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 35:
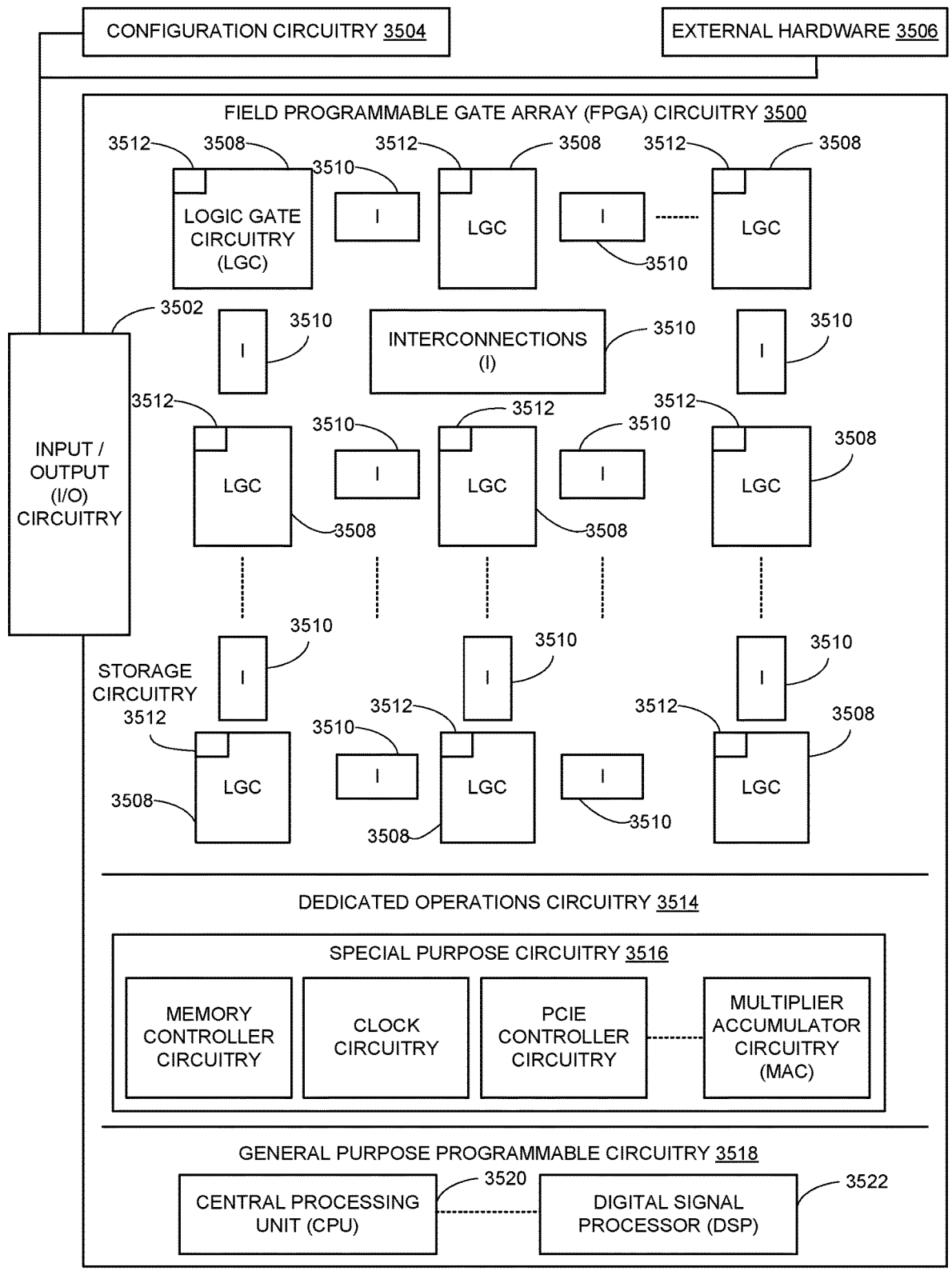
FIG. 35 is a block diagram of another example implementation of the processor circuitry of FIG. 33.

FIG. 35 is a block diagram of another example implementation of the processor circuitry 3312 of FIG. 33. In this example, the processor circuitry 3312 is implemented by FPGA circuitry 3500. The FPGA circuitry 3500 can be used, for example, to perform operations that could otherwise be performed by the example microprocessor 3400 of FIG. 34 executing corresponding machine readable instructions. However, once configured, the FPGA circuitry 3500 instantiates the machine readable instructions in hardware and, thus, can often execute the operations faster than they could be performed by a general purpose microprocessor executing the corresponding software.

More specifically, in contrast to the microprocessor 3400 of FIG. 34 described above (which is a general purpose device that may be programmed to execute some or all of the machine readable instructions represented by the flowchart of FIG. 32 but whose interconnections and logic circuitry are fixed once fabricated), the FPGA circuitry 3500 of the example of FIG. 35 includes interconnections and logic circuitry that may be configured and/or interconnected in different ways after fabrication to instantiate, for example, some or all of the machine readable instructions represented by the flowchart of FIG. 32. In particular, the FPGA 3500 may be thought of as an array of logic gates, interconnections, and switches. The switches can be programmed to change how the logic gates are interconnected by the interconnections, effectively forming one or more dedicated logic circuits (unless and until the FPGA circuitry 3500 is reprogrammed). The configured logic circuits enable the logic gates to cooperate in different ways to perform different operations on data received by input circuitry. Those operations may correspond to some or all of the software represented by the flowchart of FIG. 32. As such, the FPGA circuitry 3500 may be structured to effectively instantiate some or all of the machine readable instructions of the flowchart of FIG. 32 as dedicated logic circuits to perform the operations corresponding to those software instructions in a dedicated manner analogous to an ASIC. Therefore, the FPGA circuitry 3500 may perform the operations corresponding to the some or all of the machine readable instructions of FIG. 32 faster than the general purpose microprocessor can execute the same.

In the example of FIG. 35, the FPGA circuitry 3500 is structured to be programmed (and/or reprogrammed one or more times) by an end user by a hardware description language (HDL) such as Verilog. The FPGA circuitry 3500 of FIG. 35, includes example input/output (I/O) circuitry 3502 to obtain and/or output data to/from example configuration circuitry 3504 and/or external hardware (e.g., external hardware circuitry) 3506. For example, the configuration circuitry 3504 may implement interface circuitry that may obtain machine readable instructions to configure the FPGA circuitry 3500, or portion(s) thereof. In some such examples, the configuration circuitry 3504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 3506 may implement the microprocessor 3400 of FIG. 34. The FPGA circuitry 3500 also includes an array of example logic gate circuitry 3508, a plurality of example configurable interconnections 3510, and example storage circuitry 3512. The logic gate circuitry 3508 and interconnections 3510 are configurable to instantiate one or more operations that may correspond to at least some of the machine readable instructions of FIG. 32 and/or other desired operations. The logic gate circuitry 3508 shown in FIG. 35 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 3508 to enable configuration of the electrical structures and/or the logic gates to form circuits to perform desired operations. The logic gate circuitry 3508 may include other electrical structures such as look-up tables (LUTs), registers (e.g., flip-flops or latches), multiplexers, etc.

The interconnections 3510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 3508 to program desired logic circuits.

The storage circuitry 3512 of the illustrated example is structured to store result(s) of the one or more of the operations performed by corresponding logic gates. The storage circuitry 3512 may be implemented by registers or the like. In the illustrated example, the storage circuitry 3512 is distributed amongst the logic gate circuitry 3508 to facilitate access and increase execution speed.

The example FPGA circuitry 3500 of FIG. 35 also includes example Dedicated Operations Circuitry 3514. In this example, the Dedicated Operations Circuitry 3514 includes special purpose circuitry 3516 that may be invoked to implement commonly used functions to avoid the need to program those functions in the field. Examples of such special purpose circuitry 3516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 3500 may also include example general purpose programmable circuitry 3518 such as an example CPU 3520 and/or an example DSP 3522. Other general purpose programmable circuitry 3518 may additionally or alternatively be present such as a GPU, an XPU, etc., that can be programmed to perform other operations.

Although FIGS. 34 and 35 illustrate two example implementations of the processor circuitry 3312 of FIG. 33, many other approaches are contemplated. For example, as mentioned above, modern FPGA circuitry may include an on-board CPU, such as one or more of the example CPU 3520 of FIG. 35. Therefore, the processor circuitry 3312 of FIG. 33 may additionally be implemented by combining the example microprocessor 3400 of FIG. 34 and the example FPGA circuitry 3500 of FIG. 35. In some such hybrid examples, a first portion of the machine readable instructions represented by the flowchart of FIG. 32 may be executed by one or more of the cores 3402 of FIG. 34, a second portion of the machine readable instructions represented by the flowchart of FIG. 32 may be executed by the FPGA circuitry 3500 of FIG. 35, and/or a third portion of the machine readable instructions represented by the flowchart of FIG. 32 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 3312 of FIG. 33 may be in one or more packages. For example, the processor circuitry 3400 of FIG. 34 and/or the FPGA circuitry 3500 of FIG. 35 may be in one or more packages. In some examples, an XPU may be implemented by the processor circuitry 3312 of FIG. 33, which may be in one or more packages. For example, the XPU may include a CPU in one package, a DSP in another package, a GPU in yet another package, and an FPGA in still yet another package.

Figure 36:
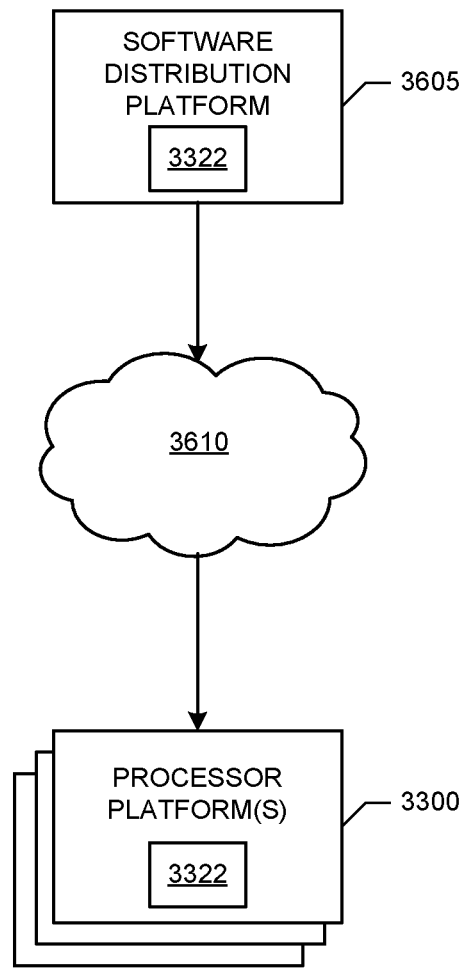
FIG. 36 is a block diagram of an example software distribution platform (e.g., one or more servers) to distribute software (e.g., software corresponding to the example machine readable instructions of FIG. 32) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 3605 to distribute software such as the example machine readable instructions 3332 of FIG. 36 to hardware devices owned and/or operated by third parties is illustrated in FIG. 36. The example software distribution platform 3605 may be implemented by any computer server, data facility, cloud service, etc., capable of storing and transmitting software to other computing devices. The third parties may be customers of the entity owning and/or operating the software distribution platform 3605. For example, the entity that owns and/or operates the software distribution platform 3605 may be a developer, a seller, and/or a licensor of software such as the example machine readable instructions 3332 of FIG. 33. The third parties may be consumers, users, retailers, OEMs, etc., who purchase and/or license the software for use and/or re-sale and/or sub-licensing. In the illustrated example, the software distribution platform 3605 includes one or more servers and one or more storage devices. The storage devices store the machine readable instructions 3332, which may correspond to the example machine readable instructions 3200 of FIG. 32, as described above. The one or more servers of the example software distribution platform 3605 are in communication with a network 3610, which may correspond to any one or more of the Internet and/or any of the example networks 3336 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 3332 from the software distribution platform 3605. For example, the software, which may correspond to the example machine readable instructions 3200 of FIG. 32, may be downloaded to the example processor platform 3300, which is to execute the machine readable instructions 3200 to implement the free viewpoint media generator system 3014. In some example, one or more servers of the software distribution platform 3605 periodically offer, transmit, and/or force updates to the software (e.g., the example machine readable instructions 3332 of FIG. 33) to ensure improvements, patches, updates, etc., are distributed and applied to the software at the end user devices.

From the foregoing, it will be appreciated that example systems, methods, apparatus, and articles of manufacture have been disclosed that enable the generation of free viewpoint media with smooth transitions across different views generated from images captured by cameras in any suitable arrangement. That is, there is no significant limitations on the cameras being in a line or positions and/or angled relative to the particular region of interest to be captured in the images. Examples disclosed herein enable the generation of the different views in free viewpoint media through the use of two independent defined control points. Using two separate control points enables the smooth transitions (by rotating virtual cameras relative to real-world cameras towards an VIPR point) while at the same time enabling the gaze of the different views to remain fixed on the region of interest (associated with the ROI point). Defining the ROI point and the VIPR point independently enables the angles of rotation of virtual cameras relative to the real-world cameras to be reduced (e.g., minimized). This reduces (e.g., minimizes) the perspective warping that needs to be applied to the real-world images, which helps to reduce excessive stretching or distortion of images that could result in degradation of image quality. Furthermore, reducing the amount of perspective warping also reduces the requirements for the real-world camera fields of view and/or the size of the sensor regions from which image data needs to be read, streamed, and/or processed. Thus, examples disclosed herein enables shorter processing times and/or higher frame rates for increased efficiency and/or improved image quality. Disclosed systems, methods, apparatus, and articles of manufacture are accordingly directed to one or more improvement(s) in the operation of a machine such as a computer or other electronic and/or mechanical device. Furthermore, by using the two separate control points to define the parameters for virtual cameras, a single arrangement of cameras can handle a larger range of different subject distances and are suitable for more uses cases than would otherwise be possible if defined based on a single control point.

Example 1 includes an apparatus, comprising at least one memory, instructions, and processor circuitry to execute the instructions to determine a first point in three-dimensional space relative to a plurality of real-world cameras, the first point corresponding to a region of interest in a real-world scene to be captured by the real-world cameras, determine, independent of the first point, a second point in the three-dimensional space, and determine parameters for a virtual camera based on both the first point and the second point, the parameters to enable generation of a virtual image from a perspective of the virtual camera based on a modification of a real-world image captured by one of the real-world cameras.

Example 2 includes the apparatus of example 1, wherein the second point is at a different location in the three-dimensional space than the first point.

Example 3 includes the apparatus of any one of examples 1 or 2, wherein the processor circuitry is to determine the second point based on user input defining a distance between the second point and one of the real-world cameras.

Example 4 includes the apparatus of any one of examples 1-3, wherein the processor circuitry is to determine a spatial relationship of the real-world cameras within the three-dimensional space, and determine the second point automatically based on the spatial relationship.

Example 5 includes the apparatus of any one of examples 1-4, wherein the real-world cameras are distributed across an array, and the processor circuitry is to determine the second point based on a position and orientation of an outermost one of the real-world cameras in the array.

Example 6 includes the apparatus of any one of examples 1-5, wherein the processor circuitry is to determine the second point as corresponding to an intersection of principal axes of two of the real-world cameras.

Example 7 includes the apparatus of any one of examples 1-6, wherein the processor circuitry is to determine the parameters for the virtual camera such that a principal axis of the virtual camera passes through the second point.

Example 8 includes the apparatus of any one of examples 1-7, wherein the processor circuitry is to determine the first point based on user input defining a distance between the region of interest and one of the real-world cameras.

Example 9 includes the apparatus of any one of examples 1-7, wherein the processor circuitry is to determine the first point automatically based on an analysis of images captured by the real-world cameras.

Example 10 includes the apparatus of any one of examples 1-9, wherein the modification of the real-world image to generate the virtual image includes at least one of projecting the real-world image onto a virtual image plane associated with the virtual camera, cropping the real-world image, or warping the real-world image.

Example 11 includes the apparatus of any one of examples 1-10, wherein the processor circuitry is to cause the real-world cameras to capture synchronized images of the real-world scene to facilitate generation of free viewpoint media based on the captured images.

Example 12 includes at least one non-transitory computer readable medium, comprising instructions that, when executed, cause processor circuitry to at least determine a first point in a real-world scene towards which a plurality of real-world cameras are facing, the first point corresponding to a region of interest in the real-world scene, determine, separately from the first point, a second point, and determine parameters for virtual cameras based on both the first point and the second point, the parameters to enable generation of virtual images corresponding to different views of free viewpoint media, different ones of the virtual images corresponding to different ones of the virtual cameras and based on modifications of real-world images captured by different ones of the real-world cameras.

Example 13 includes the at least one non-transitory computer readable medium of example 12, wherein the first point is to be a first distance from a first camera of the real-world cameras, and the second point is to a second distance from the first camera, the second distance greater than the first distance.

Example 14 includes the at least one non-transitory computer readable medium of any one of examples 12 or 13, wherein the instructions cause the processor circuitry to determine the second point based on user-defined distance between the real-world cameras and the second point.

Example 15 includes the at least one non-transitory computer readable medium of any one of examples 12-14, wherein the instructions cause the processor circuitry to determine a position and orientation of each one of the real-world cameras relative to the real-world scene, and determine the second point automatically based on the position and orientation of a first one of the real-world cameras.

Example 16 includes the at least one non-transitory computer readable medium of example 15, wherein the first one of the real-world cameras is an outermost one of the real-world cameras with all other ones of the real-world cameras positioned to one side of the first one of the real-world cameras.

Example 17 includes the at least one non-transitory computer readable medium of any one of examples 12-16, wherein the instructions cause the processor circuitry to determine the second point based on an intersection of principal axes of two of the real-world cameras.

Example 18 includes the at least one non-transitory computer readable medium of any one of examples 12-17, wherein the instructions cause the processor circuitry to determine the parameters for the virtual cameras such that a principal point for a first one of the virtual cameras is at a point within a corresponding first virtual image other than a center of the first virtual image.

Example 19 includes a method comprising determining a region of interest (ROI) point in a real-world scene to be imaged by multiple real-world cameras, the ROI point corresponding to a region of interest within a field of view of each of the multiple real-world cameras, determining a virtual image plane rotation (VIPR) point relative to the real-world cameras, and determining parameters for virtual cameras based on both the ROI point and the VIPR point, the parameters to define orientations of virtual image planes corresponding to the virtual cameras, the image planes to face directly towards the VIPR point.

Example 20 includes the method of example 19, further including associating the parameters for different ones of the virtual cameras with images captured by corresponding different ones of the real-world cameras to enable generation of virtual images of the real-world scene from perspectives of the virtual cameras, the virtual images corresponding to different viewpoints of free viewpoint media.

Example 21 includes the method of example 20, wherein the determining of the parameters includes determining the parameters so that the region of interest is positioned at a fixed location within different ones of the virtual images.

Example 22 includes the method of any one of examples 19-21, wherein the determining of the VIPR point includes determining a point through which principal axes of at least two of the real-world cameras pass.

Example 23 includes the method of any one of examples 19-22, wherein the determining of the VIPR point is based on a position and orientation of at least one of the real-world cameras relative to the real-world scene.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   instructions in the apparatus; and
   at least one programmable circuit to be programmed based on the instructions to:
   determine a first point in three-dimensional space relative to a plurality of real-world cameras, the first point corresponding to a region of interest in a real-world scene to be captured by the real-world cameras;
   determine, independent of the first point, a second point in the three-dimensional space; and
   determine parameters for a virtual camera based on both the first point and the second point, the parameters to enable generation of a virtual image from a perspective of the virtual camera based on a modification of a real-world image captured by one of the real-world cameras, the modification including at least one of projecting the real-world image onto a virtual image plane associated with the virtual camera, cropping the real-world image, or warping the real-world image.

2. The apparatus of claim 1, wherein the second point is at a different location in the three-dimensional space than the first point.

3. The apparatus of claim 1, wherein one or more of the at least one programmable circuit is to determine the second point based on user input defining a distance between the second point and one of the real-world cameras.

4. The apparatus of claim 1, wherein one or more of the at least one programmable circuit is to:
   determine a spatial relationship of the real-world cameras within the three-dimensional space; and
   determine the second point automatically based on the spatial relationship.

5. The apparatus of claim 1, wherein the real-world cameras are distributed across an array, and one or more of the at least one programmable circuit is to determine the second point based on a position and an orientation of an outermost one of the real-world cameras in the array.

6. The apparatus of claim 1, wherein one or more of the at least one programmable circuit is to determine the second point as corresponding to an intersection of principal axes of two of the real-world cameras.

7. The apparatus of claim 1, wherein one or more of the at least one programmable circuit is to determine the parameters for the virtual camera such that a principal axis of the virtual camera passes through the second point.

8. The apparatus of claim 1, wherein one or more of the at least one programmable circuit is to determine the first point based on user input defining a distance between the region of interest and one of the real-world cameras.

9. The apparatus of claim 1, wherein one or more of the at least one programmable circuit is to determine the first point automatically based on an analysis of images captured by the real-world cameras.

10. The apparatus of claim 1, wherein one or more of the at least one programmable circuit is to cause the real-world cameras to capture synchronized images of the real-world scene to facilitate generation of free viewpoint media based on the captured images.

11. At least one non-transitory computer readable medium, comprising instructions stored thereon cause at least one programmable circuit to at least:
    determine a first point in a real-world scene towards which a plurality of real-world cameras face, the first point corresponding to a region of interest in the real-world scene;
    determine, separately from the first point, a second point based on an intersection of principal axes of two of the real-world cameras; and
    determine parameters for virtual cameras based on both the first point and the second point, the parameters to enable generation of virtual images corresponding to different views of free viewpoint media, different ones of the virtual images corresponding to different ones of the virtual cameras and based on modifications of real-world images captured by different ones of the real-world cameras.

12. The at least one non-transitory computer readable medium of claim 11, wherein the first point is to be a first distance from a first camera of the real-world cameras, and the second point is to be a second distance from the first camera, the second distance greater than the first distance.

13. The at least one non-transitory computer readable medium of claim 11, wherein the instructions are to cause one or more of the at least one programmable circuit to:
    determine a position and an orientation of each one of the real-world cameras relative to the real-world scene; and
    determine the second point automatically based on the position and the orientation of a first one of the real-world cameras.

14. The at least one non-transitory computer readable medium of claim 13, wherein the first one of the real-world cameras is an outermost one of the real-world cameras with all other ones of the real-world cameras positioned to one side of the first one of the real-world cameras.

15. The at least one non-transitory computer readable medium of claim 11, wherein the instructions are to cause one or more of the at least one programmable circuit to determine the parameters for the virtual cameras such that a principal point for a first one of the virtual cameras is at a point within a corresponding first virtual image other than a center of the first virtual image.

16. A method comprising:
determining a region of interest (ROI) point in a real-world scene to be imaged by multiple real-world cameras, the ROI point corresponding to a region of interest within a field of view of each of the multiple real-world cameras;
determining a virtual image plane rotation (VIPR) point relative to the real-world cameras; and
determining parameters for virtual cameras based on both the ROI point and the VIPR point, the parameters to define orientations of virtual image planes corresponding to the virtual cameras, the image planes to face directly towards the VIPR point.

17. The method of claim 16, including associating the parameters for different ones of the virtual cameras with images captured by corresponding different ones of the real-world cameras to enable generation of virtual images of the real-world scene from perspectives of the virtual cameras, the virtual images corresponding to different viewpoints of free viewpoint media.

18. The method of claim 17, wherein the determining of the parameters includes determining the parameters so that the region of interest is positioned at a fixed location within different ones of the virtual images.

19. The method of claim 16, wherein the determining of the VIPR point includes determining a point through which principal axes of at least two of the real-world cameras pass.

20. The method of claim 16, wherein the determining of the VIPR point is based on a position and an orientation of at least one of the real-world cameras relative to the real-world scene.

* * * * *